US010240007B2

(12) United States Patent
De Vos et al.

(10) Patent No.: US 10,240,007 B2
(45) Date of Patent: Mar. 26, 2019

(54) SHAPED POLYLACTIDE ARTICLE AND METHOD OF PREPARATION

(71) Applicant: PURAC BIOCHEM BV, Gorinchem (NL)

(72) Inventors: Siebe Cornelis De Vos, Gorinchem (NL); Robert Edgar Haan, Gorinchem (NL); Geraldus Gerardus Johannes Schennink, Wageningen (NL)

(73) Assignee: PURAC BIOCHEM BV, Gorinchem (NL)

( * ) Notice: Subject to any disclaimer, the term of this patent is extended or adjusted under 35 U.S.C. 154(b) by 4 days.

(21) Appl. No.: 15/529,039

(22) PCT Filed: Dec. 2, 2015

(86) PCT No.: PCT/EP2015/078368
§ 371 (c)(1),
(2) Date: May 23, 2017

(87) PCT Pub. No.: WO2016/102163
PCT Pub. Date: Jun. 30, 2016

(65) Prior Publication Data
US 2017/0260338 A1    Sep. 14, 2017

(30) Foreign Application Priority Data

Dec. 22, 2014   (EP) .................................. 14199609

(51) Int. Cl.
*C08J 3/00* (2006.01)
*B29C 45/72* (2006.01)
*B29C 45/00* (2006.01)
*C08J 5/00* (2006.01)
*C08L 67/04* (2006.01)
*B29K 67/00* (2006.01)

(52) U.S. Cl.
CPC ........... *C08J 3/005* (2013.01); *B29C 45/0001* (2013.01); *B29C 45/72* (2013.01); *C08J 5/00* (2013.01); *C08L 67/04* (2013.01); *B29K 2067/046* (2013.01); *C08J 2367/04* (2013.01); *C08J 2467/04* (2013.01); *C08L 2205/025* (2013.01)

(58) Field of Classification Search
CPC .............. C08L 67/04; C08J 3/00; C08J 3/005
See application file for complete search history.

(56) References Cited

U.S. PATENT DOCUMENTS

2008/0207840 A1*   8/2008  Sodergard .............. C08L 67/04
                                                            525/415
2009/0246544 A1*  10/2009  Narita .................... B29C 67/24
                                                            428/480

FOREIGN PATENT DOCUMENTS

| EP | 1 867 679 A1 | 12/2007 |
| EP | 2 048 186 A1 | 4/2009 |
| EP | 2 116 575 A1 | 11/2009 |
| EP | 2 138 542 A1 | 12/2009 |
| EP | 2 471 864 A1 | 7/2012 |
| EP | 2 746 318 A1 | 6/2014 |
| JP | 2013-129763 A | 7/2013 |
| JP | 2013-234277 A | 11/2013 |
| WO | 2008/013295 A1 | 1/2008 |

OTHER PUBLICATIONS

Tsuji, et al. "Poly(lactide) Stereocomplexes: Formation, Structure, Properties, Degradation, and Applications", Macromolecular Biosciences, 5, 569-597, Jul. 4, 2005. (Year: 2005).*
Tsuji et al., "Isothermal and non-isothermal crystallization behavior of poly(L-lactic acid): Effects of stereocomplex as nucleating agent," Polymer, 2006, vol. 47, pp. 3826-3837.
Anderson et al., "Melt preparation and nucleation efficiency of polylactide stereocomplex crystallites," Polymer, 2006, vol. 47, pp. 2030-2035.
Sun et al., "Crystallization Behavior of Asymmetric PLLA/PDLA Blends," The Journal of Physical Chemistry B, 2011, vol. 115, pp. 2864-2869.
Apr. 18, 2016 International Search Report issued in International Patent Application No. PCT/EP2015/078368.
Apr. 18, 2016 Written Opinion of the International Searching Authority issued in International Patent Application No. PCT/EP2015/078368.
Apr. 13, 2018 Notice of Reasons for Rejection issued in Japanese Patent Application No. 2017-531606.

* cited by examiner

*Primary Examiner* — Christopher M Rodd
(74) *Attorney, Agent, or Firm* — Oliff PLC

(57) ABSTRACT

A method for preparing a shaped polylactide article including stereocomplex polylactide and to a shaped article obtainable by the method. In particular the method comprises melt mixing and solidifying poly-L-lactide (PLLA) and poly-D-lactide (PDLA) homopolymers in a weight ratio whereby one of the homopolymers is in excess, subsequently solid mixing the so obtained blend with additional homopolymer, and shaping the obtained solids mixture.

15 Claims, 15 Drawing Sheets

SHAPED POLYLACTIDE ARTICLE AND METHOD OF PREPARATION

The instant invention relates to a method for preparing a shaped polylactide article comprising stereocomplex polylactide and to a shaped article obtainable by said method.

Biobased polymers are interesting as alternatives to petroleum-derived polymers used in plastics used in daily life. Biobased polymers are attractive both for their numerous end of life options, including compostability, and for the fact that they can be obtained from renewable resources. Polylactic acid, also known as polylactide or PLA, has drawn particular attention as a useful polymer that can be degraded under industrial composting conditions. Further, the raw material for producing polylactic acid, e.g. lactic acid or lactide (which is the cyclic diester of lactic acid), can be obtained from sugars derived from the agricultural industry.

PLA has attractive properties, such as high stiffness, strength and gloss, and allows facile melt processing into, e.g., fibers, films and injection moulded products. However, traditional PLA resins generally suffer from poor dimensional stability above the glass transition temperature of about 50-70° C., and low toughness, which limits practical application as a resin in general-purpose plastics.

There is a continuous search for PLA-based bioplastics that show increased heat resistance. It has been previously shown that the melting point of PLA resins can be increased from about 130-180° C. to about 190-250° C. by the formation of a so-called stereocomplex. A stereocomplex is a racemic crystal formed by the interaction of PLA helices of opposite chirality, namely that of the homopolymer of the L-enantiomer of lactic acid, also referred to as PLLA, and equal amounts of the homopolymer of the D-enantiomer of lactic acid, also referred to as PDLA. In principle, the heat resistance of a PLA article can be increased quite significantly if crystallinity is imparted into products made of PLA and if PLA comprises such stereocomplex crystallites. The presence of a significant amount of stereocomplex crystallites increases the temperature window in which the material can be used.

Blends of PLLA and PDLA are known to form stereocomplex PLA, also referred to herein as stereocomplex blends. However, obtaining a high stereocomplex content in such PLA blends is not an easy task, because of the competition between PLLA and PDLA crystallizing as homocrystals—the so-called alpha-phase—and their racemic crystallization into the desired sc-PLA phase. The additional problem is that such PLLA and PDLA blends, when subsequently subjected to melt processing conditions, i.e., traditional polymer shaping methods like profile extrusion, injection moulding, thermoforming, calendering, spinning, etc., often tend to re-crystallize into a mixture with homopolymer structures and relatively low content of stereocomplex crystals. Although such materials typically meet the condition of having near to equal amounts of PLLA and PDLA, and a certain fraction of sc-PLA crystals, their thermal performance is inferior to what can be achieved by maximizing the sc-PLA content of the composition. Although homogeneous melt mixing of high molecular weight polymers is thus easily done in standard equipment such as (twin-screw) extruders and batch kneaders, achieving full stereocomplex PLA from mixtures of PLLA and PDLA requires development of suitable methods and conditions that favour sc-PLA crystallization and suppress homocrystallization at the same time.

For instance, EP 2 471 864 describes a method for producing a PLA stereocomplex including chaotic mixing of PLLA and PDLA in a weight ratio span between 30:70 and 70:30. The PLA stereocomplex is described to have a crystal melting peak temperature of 215° C. or more. EP 1 867 679 describes obtaining a PLA composition by melting and kneading PLLA and PDLA, in particular by kneading 25-75 wt. parts of PLLA and 75-25 weight parts of PDLA at 230-260° C. EP 2 138 542 describes a polylactic acid composition (A) comprising a polylactic acid component (B) comprising at least 90 mol % of an L-lactic acid unit and less than 10% of copolymerizing component units other than L-lactic acid, and a polylactic acid component (C) comprising at least 90 mol % of a D-lactic acid unit and less than 10 mol % of copolymerizing component units other than D-lactic acid, which is a mixed composition with a (B)/(C) weight ratio of between 10/90 and 90/10. US 2008/207840 describes polylactic acid blends prepared by simple blending of PLA polymers of opposite stereoforms, followed by processing, e.g. by injection moulding, under specific conditions of temperature and pressure so as to produce a blend which, on differential scanning calorimetry, exhibits two peaks within the melting range of the stereocomplex.

The inventors have found an efficient method for preparing a shaped polylactide article comprising stereocomplex polylactide (sc-PLA) whereby such problems are minimized, and the sc-PLA crystalline fraction in the final shaped product is maximized for practical utilization of the high melting point of sc-PLA. In particular, a method as described herein includes the following steps:

a) mixing an amount of a first homopolylactide with an excess amount of a second homopolylactide in the molten state to provide a molten blend, the first and second homopolylactides being different from each other and selected from a poly-D-lactide (PDLA) homopolymer and a poly-L-lactide (PLLA) homopolymer;

b) solidifying the molten blend and allowing it to crystallize to provide a solidified blend comprising sc-PLA;

c) mixing the solidified blend with an additional amount of the first homopolylactide in the solid state to provide a solids mixture;

d) shaping the solids mixture by melt processing the solids mixture at a temperature above the melting temperature of the PDLA and PLLA homopolymers and below the melting temperature of the sc-PLA, and cooling the melt processed mixture to a temperature below the melting temperature of the PDLA and PLLA homopolymers to provide a shaped polylactide article comprising sc-PLA.

This method was found to provide a shaped, semi-crystalline PLA article with a high stereocomplex content and good mechanical and thermal properties. Surprisingly, properties of shaped PLA articles obtainable by the method according to the invention have been found to be superior to the properties of shaped articles obtained by other methods, e.g., stereocomplex blends obtained by melt mixing all constituents in the final blend ratio at once. Further, a solids mixture as described herein was found to be easier to process and shape than stereocomplex blends obtained by melt mixing all constituents in the final blend ratio at once, which is surprising in view of the prior art that pays broad attention to intensive mixing of PLLA and PDLA prior to shaping. It is observed that the expressions 'lactide homopolymer' and 'homopolylactide' used throughout this text have the same meaning.

These and other advantages, objects, and features of the invention will become apparent from the following detailed description.

A brief description of the drawings is as follows.

Figure 1:
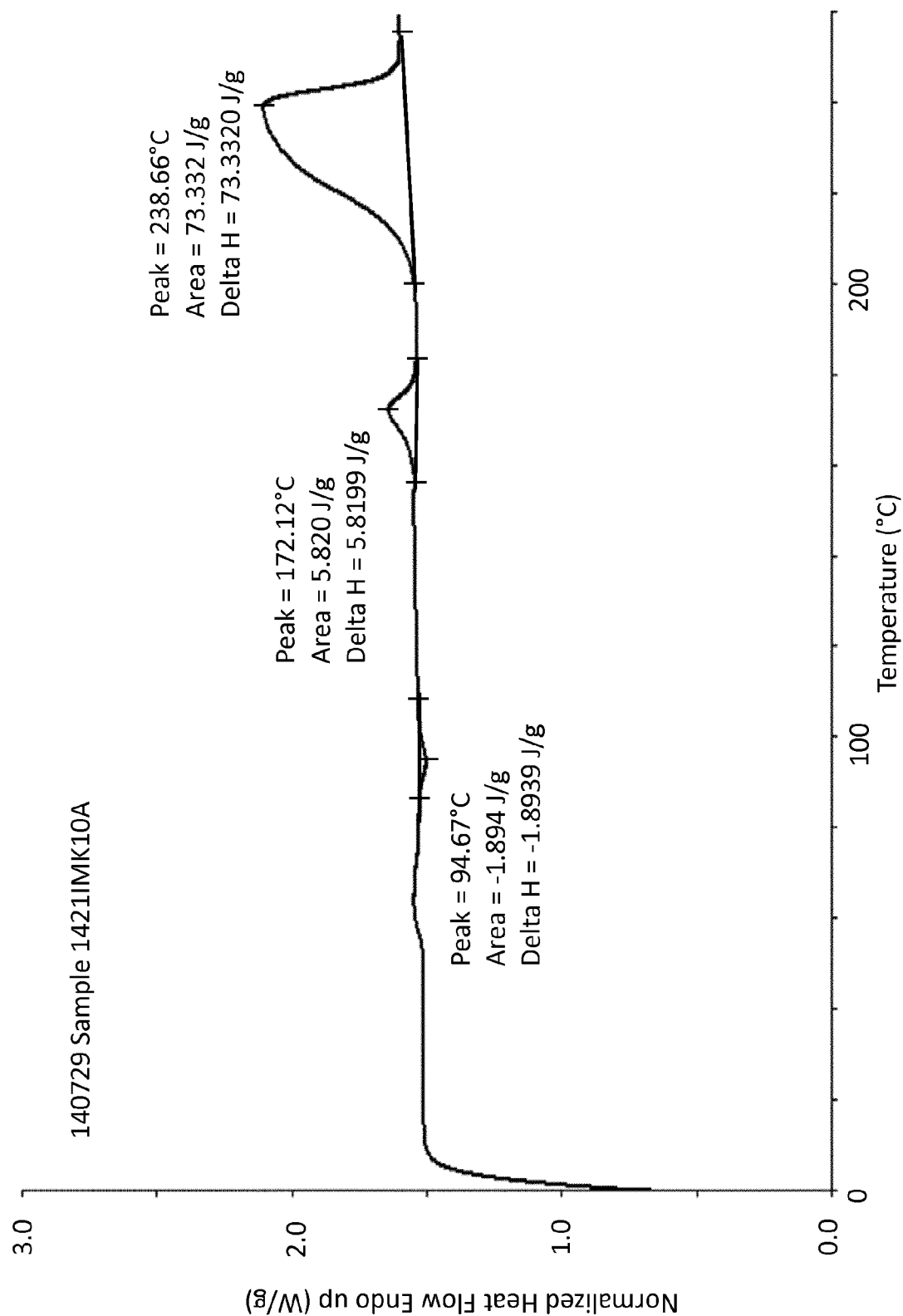
FIG. 1 shows the DSC thermogram for the PLA shaped article of Example 1 obtained from a solids mixture under injection molding conditions (A) as detailed in Table 1.

In a method as described herein PLA homopolymers are poly-D-lactic acid (PDLA) homopolymer and poly-L-lactic acid (PLLA) homopolymer, which generally are substantially enantiomerically pure. Substantially enantiomerically pure in the context of the instant application means that the optical purity of PDLA and PLLA is of at least 96%, in particular at least 99%.

The PLLA and PDLA homopolymers may generally have a high molecular weight. For instance, the weight average, absolute molecular weight ($M_w$) of at least one of the PLLA and PDLA homopolymers may be of at least 10000 g/mol, preferably at least 40000 and more preferably at least 80000 g/mol. As a mode of example the $M_w$ of PLLA and/or PDLA may be of at most 250000, in particular at most 200000 and more in particular at most 150000 g/mol. The molecular weight of PLLA homopolymer may be higher than the molecular weight of PDLA homopolymer, or vice versa. For instance, the $M_w$ of PDLA may be of at most 70000, and the $M_w$ of PLLA may be of at most 150000 g/mol, or vice versa.

The molecular weight should be determined as absolute values by methods known in the art, e.g., using gel permeation chromatography (GPC) with triple detection, i.e., refractive index (RI), light scattering (LALLS, and viscosimetry, using hexafluoroisopropanol (HFiP) as the eluent.

PDLA and PLLA homopolymers can be prepared by methods known in the art and are commercially available. Examples of commercially available PDLA and PLLA include, e.g., Synterra® PDLA 1010, Synterra® PDLA 1510, Synterra® PLLA 1010, and Synterra® PLLA 1510 from Synbra Technology b.v., The Netherlands, Revode PLA (e.g. Revode 101, Revode 190 or Revode 201) obtainable from Hisun Biomaterials, and Nature-Works Ingeo HP-grades with high L-% or low D-%.

In a method according to the invention, an amount of a first homopolylactide is mixed with an excess amount of a second homopolylactide, the first and second homopolylactides being different from each other and selected from a PDLA and a PLLA homopolymer, respectively.

Generally, the weight ratio of the second homopolymer with respect to first homopolymer is of at least 75:25, in particular of at least 80:20 and more in particular of at least 90:10, and is of at most 99:1, in particular of at most 98:2 and more in particular of at most 95:5.

As indicated above the homopolylactides are mixed in the molten state, so at a processing temperature above the melting point of both thermoplastic PLA resins. Said temperature may depend on the nature of the homopolylactides used and/or the weight ratio between the homopolylactides. Accordingly, melt mixing may be performed at a temperature from 170 to 230° C., and in particular from 180 to 220° C. Higher temperatures may be used but are less preferred as will require more energy, and may cause discoloration, viscosity-loss or further undesired degradation of the PLA resins.

Even though melt mixing of the PLLA and PDLA homopolymers can be performed in absence of any additives, it may be preferred to perform the mixing in the presence of additives such as anti-oxidants (e.g., Irgafos® 126, 168, and Evernox® 10), nucleating agents (e.g., talcum or salts of dimethyl 5-sulfoisophthalate), mineral fillers (e.g. chalk or kaolin), impact modifiers, compatibilizers, and/or chain extenders (e.g., Joncryl ADR-4368 or BioAdimide 500XT). Mixing in the presence of stabilizers and, optionally, nucleating agents may be preferred. In several embodiments, mixing is performed in the presence of a nucleating agent, in particular in the presence of a salt of dimethyl 5-sulfoisophthalate. Other additives that may be mentioned include polymer additives known to a skilled person.

Notably the inventors have found that in a method as described herein the presence of such other additives, chiefly processing aids and fillers, is not necessary for obtaining a shaped PLA article with good properties. Accordingly, in several embodiments the instant invention relates to a method wherein melt mixing is performed in the absence of such other additives, and in particular in the absence of fillers and/or processing aids.

The PLLA and PDLA homopolymers and any additives are preferably dried prior to melt mixing, under vacuum or using nitrogen or dry air. Suitable drying apparatuses include, e.g., a desiccant air dryer and other equipment used in polymer industry as known to those skilled in the art. PLLA and PDLA homopolymers are dried according to the prescription of the supplier and commonly to arrive at <250 ppm moisture on the pellets.

Mixing the PLLA and PDLA homopolymers in the molten state, prior to preparation of the dry solids mixture, may be performed by methods and apparatuses known in the art.

The first and second homopolylactides and any additives may be mixed in any order, there is no preference as long as a homogeneous compound is obtained. In several embodiments, it is preferred that the melt mixing of step a) is performed by extrusion to provide an extruded molten blend. Most commonly, the PLLA/PDLA premix is compounded on a twin-screw extruder.

Generally, the different components will be added to the mixing equipment in solid form, but they may also be added in molten form or in solution.

Suitable apparatus for melt mixing include batch and continuous equipment with heating means, for example a batch mixer/kneader, a batch extruder, a single-screw extruder, a single-screw MRS extruder, a co-rotating twin-screw extruder or counter-rotating twin-screw extruder, a multi-screw extruder or a ring-extruder, a planetary roller extruder, a batch type reactor equipped with an agitation element, a continuous type reactor (e.g. a BUSS-Kneader or List KneaderReactor), or alternatively a plug flow reactor equipped with static mixing elements, in case the feed is a molten polymer flow.

In several embodiments, melt mixing as described herein is performed by traditional extrusion using a co-rotating, closely-intermeshing twin-screw extruder.

The molten blend obtained in the melt mixing step, is solidified first, and subsequently allowed to crystallize upon cooling, to provide a solidified material comprising sc-PLA.

Solidification is performed by cooling the molten blend to a temperature below the glass transition temperature of PLA, which is 50-60° C. In traditional extrusion, for example, the melt is extruded through a die(s), cooled by passing through a water bath with a temperature from 5 to 70° C., e.g., from 5 to 55° C., in particular from 10 to 45° C., and pelletized using a strand pelletizer. Other means of plastics pelletization are also common practice, e.g. a die face cutter or under water pelletizer. All common techniques used in plastics processing produce solid polymer particles, with spherical or cylindrical geometry for easy handling.

Subsequent crystallization under conditions that promote crystallization of PLA—automatically resulting in drying—of the solid pellets is performed by methods known in the art. For instance, by vacuum or air drying the solidified blend, e.g., at a temperature from 70 to 130° C., resulting in drying and simultaneous crystallization of the PLA. A temperature range that favours the desired crystallization of the PLA homopolymer is between 70 and 130° C., preferably between 80 and 120° C., and more preferably between 90 and 110° C. (step b).

Crystallizers are known in the art, e.g. various batch and continuous types from Hosakawa Micron, batch type, continuous fluidized bed type, with IR heaters, etc.

Solidification and crystallization of the molten blend, e.g., upon extrusion thus provides a solid material, which comprises stereocomplex PLA (sc-PLA). The remaining PLA is semi-crystalline, typically with a crystallinity of 20-70%, depending on overall composition and crystallization conditions. The remaining fraction of the PLA resin constitutes the non-crystalline, amorphous fraction of the material.

The amount of sc-PLA in the solidified blend depends on the nature and weight ratio of the PLLA and PDLA homopolymers, and on crystallization conditions.

A solidified blend as described herein may generally comprise about 0.5-50 wt. % of PLA having a stereocomplex structure (sc-PLA), based on the total amount of PLLA and PDLA used for the melt mixing, in particular 1-20 wt. %, and more in particular 2-10 wt. %. The amount of sc-PLA, more in particular the ratio between the crystalline heat of fusion of PLA homocrystal (Tm<190° C.) and that of sc-PLA (Tm>190° C.), can be determined by differential scanning calorimetry (DSC).

DSC may be performed as described in the standard method ASTM D3418. In particular, a first heating scan may be recorded from 0° C. to 260° C. with a rate of 10° C./min using a Perkin Elmer Diamond DSC in combination with large volume (60 μl) stainless steel cups. A DSC thermogram of a solidified blend as described herein may generally show one or two melting peaks in a temperature window between 130 to 190° C., in particular from 140 to 180° C. for PDLA and/or PLLA homopolymer, and a melting peak for sc-PLA in a temperature range between 190 to 260° C., in particular from 200 to 250° C. The peaks observed for homopolymer PLA will depend on the PLLA and PDLA weight ratio used and on whether all homopolylactide used in minor amount has formed sc-PLA. From the DSC thermograms the heat of crystal fusion (melt enthalpy) and the melting peak temperatures for the homopolymer PDLA or PLLA crystals and stereocomplex PLA crystals can be determined. The ratio of PLA with homopolymer structure (alpha crystal form) and of PLA with stereocomplex structures can be assessed from their respective heats of fusion, below and above 200° C., respectively.

Without being bound to theory, it is believed to be essential to the invention, that the solidified PLLA/PDLA blend comprises a fraction of sc-PLA crystallites that serves to nucleate further sc-PLA crystallization in subsequent processing.

The solidified blend is preferably in pelletized form as indicated before, but the solidified blend may also be in powder form, or any other solid particle that can be dosed into polymer processing equipment.

In step c) of the invented method, a solidified blend as described herein is mixed with an additional amount of the first homopolylactide—the one not in excess—in the solid state, to provide a solids mixture. Mixing in the solid state (also referred to herein as solid mixing) means that the solidified blend and the additional first homopolylactide neither are in molten form nor in solution.

The additional amount of first homopolylactide may depend on the PLLA and PDLA weight ratio in the solidified blend and may be generally chosen to provide a final PLLA to PDLA weight ratio in de solids mixture of, e.g., from 30:70 to 70:30, in particular from 40:60 to 60:40, more in particular from 45:55 to 55:45, or even of about 50:50. The weight ratio in the solids mixture can be easily determined from the total amount of PLLA and PDLA homopolymer used in the melt mixing step and from the additional amount added in the solid mixing step.

Generally, the mixing temperature is below the glass transition temperature of the first and second homopolylactides. As a mode of example, solid mixing may be performed at a temperature from 0 to 70° C., in particular from 5 to 50° C., and more in particular from 10 to 30° C. (step c). Higher temperatures may bring about softening, sticking or even full melting of the PLA blend.

Solid mixing may be performed under inert atmosphere, e.g., under nitrogen or argon blanketing.

Solid mixing of the solidified blend and the additional amount of first homopolylactide, may be performed in the presence of additives as described above for melt mixing, but the presence of such other additives, chiefly processing aids and fillers, is not necessary for obtaining a shaped PLA article with good properties. Accordingly, in several embodiments the instant invention relates to a method wherein solid mixing is performed in the absence of such other additives, and in particular in the absence of fillers and/or processing aids.

The amount of additives added to the solidified mixture and the additional amount of first homopolylactide for solid mixing, may generally be of at most 50 wt. %, based on the total amount of components in the mixture, in particular of at most 30 wt. % and even more in particular of at most 10 wt. %, or even 0 wt. % if no additives are added.

Alternatively or additionally, additives may also be added at a later stage, for instance to the solids mixture prior to or during a subsequent shaping step as described below.

The solidified blend and the first homopolylactide, and any optional additives, are preferably used dry for solid mixing. Accordingly, the different components may be dried prior to solid mixing, e.g., as described above for melt mixing.

Solid mixing may be performed by methods and apparatus known in the art.

The solidified blend, the first homopolylactide and any additives may be mixed in any order.

Generally, the different components are added to the mixing unit in solid form.

Suitable apparatuses for solid mixing include mixing units such as a tumbler-type powder mixer, a continuous powder mixer or mill, and pellet mixing devices such as Hosakawa Micron screw or paddle mixers, Continental Rollo-mixer, Nauta mixers, and other suitable types of plastic pellet homogenization equipment used in the industry.

Without being bound to any theory, it is believed that the pellets of mixed sc-PLA and homopolymer structures promote stereocomplex formation during subsequent processing and shaping more efficiently than, e.g., pellets of full stereocomplex PLA. This may be tentatively explained by the nucleating performance of sc-PLA crystallites present in the solidified blend that endorse sc-PLA crystallization, while melt-processing the solids mix prior to shaping is done at temperatures above the melting point of the homopolylactides, promoting their diffusion and inclusion in growing sc-PLA crystals.

In a process as described herein, the solids mixture is shaped at a temperature above the melting temperature of the PDLA and PLLA homopolymers and below the melting temperature of the sc-PLA, and the shaped solids mixture is cooled at a temperature below the melting temperature of the PDLA and PLLA homopolymers to provide a shaped PLA article comprising high sc-PLA content.

Shaping and cooling the solids mixture under these conditions has been found to result in a shaped article with a high content of sc-PLA. Without being bound to any theory it is believed that, by carefully selecting a temperature window during melt processing below the melting point of sc-PLA, sc-PLA structures originally present in the solids mixture are maintained during the processing and shaping process whereas, by working at a temperature above the melting point of PLLA and PDLA homopolymers, homopolymer PLA is molten and prone to participate in sc-PLA crystallization. Under such conditions the molten homopolymer can more easily rearrange itself into stereocomplex structures, i.e. to form new stereocomplex crystallites.

The melting temperatures of the PDLA and PLLA homopolymers and of the sc-PLA may depend on the specific nature and structure of the PDLA homopolymer, PLLA homopolymer and sc-PLA. Such melting temperatures can be easily determined by DSC as described above or may be readily known, e.g., from the supplier of the PDLA and PLLA homopolymers. The melting peaks identified for PDLA homopolymer, PLLA homopolymer and sc-PLA may be taken as the melting temperatures. Accordingly, shaping is performed at a temperature above the higher melting peak observed for homopolymer PLA structures and below the lower melting peak observed for stereocomplex PLA structures. As it is known in the art, homopolymer PLA structures generally display a melting peak from 130 to 180° C. as determined by DSC, and in particular from 150 to 170° C. On the other hand, stereocomplex PLA structures generally display a melting peak from 190 to 250° C. as determined by DSC, and in particular from 220 to 240° C.

Melt-processing of the starting solids mixture prior to shaping is thus generally performed at temperatures of above 180 and below 240° C., and in particular above 190 and below 230° C. More in particular melt-processing may be performed at a temperature of from 210 to 220° C.

Cooling the melt-processed material in order to arrest it into a fixed shape may be generally performed to a temperature of at most 180° C., in particular of at most 150° C. and more in particular of at most 100° C. Generally cooling may be performed down to room temperatures, e.g., to between 10 and 50° C.

Shaping and, optionally, cooling may be preferably performed under inert atmosphere, e.g. under nitrogen.

Shaping and cooling may be performed by methods and apparatus known in the art. In particular a solids mixture as described herein may be directly used in processes commonly used in the art for shaping PLA, provided that the temperature profiles used correspond to those of a method as described herein.

For instance shaping and cooling may be performed by extrusion (e.g. pipe and profile extrusion), moulding (e.g. injection moulding) and thermoforming, preferably by extrusion or moulding. Injection moulding may be performed with injection pressure from 50 to 5000 bar, more in particular from 100 to 3000 bar, and more in particular from 500 to 2000 bar.

Solids mixtures as described herein have been found to be shaped in an easier manner than mixtures with equivalent contents of PDLA and PLLA obtained by different methods, e.g., from fully melt blended mixtures. For instance, solids mixtures as described herein can be easily moulded by injection in the absence of processing aids or fillers and at relatively low pressures (e.g. below 2000 bar) when compared to fully melt blended mixtures, which generally require processing aids and fillers and also require higher injection moulding pressures.

A shaped PLA article comprising sc-PLA obtainable by a method as described herein has also been found to have good mechanical and thermal properties. Without being bound to any theory it is contended that the good thermal and mechanical properties of shaped articles as described herein are the result of a high sc-PLA content in the shaped articles. In several embodiments the shaped PLA article comprises primarily sc-PLA as can be checked by DSC.

A shaped PLA article as described herein may generally show a melting peak of at least 220° C. as determined by DSC, in particular of at least 230° C., more in particular of at least 235° C., and even more in particular of at least 239° C. Owing to the high melting temperature of the sc-PLA structures obtained, a shaped article as described herein generally is able to withstand relatively high temperatures (e.g. from 100 to 200° C.)

A unique feature of shaped PLA articles prepared according to the invention is that in a DSC thermogram no significant recrystallization—as indicated by a negative, exothermal heat of (re)crystallization—is observed between the PLA homopolymer melt region and the sc-PLA melt region at higher temperatures. Most preferably, the low melting PLA homopolymer melt region is also absent.

Furthermore, a shaped PLA article as described herein will generally show a melting enthalpy for sc-PLA ($\Delta H_{sc}$) of at least 10 J/g (e.g. with a melting peak above 200° C.) and melting enthalpy for homopolymer PLA ($\Delta H_{hc}$) of less than 10 J/g (e.g. with a melting peak below 200° C.) as measured by DSC (+10° C./min), in particular a $\Delta H_{sc}$ of at least 30 J/g and a $\Delta H_{hc}$ of less than 5 J/g, more in particular a of at least 60 J/g and a $\Delta H_{hc}$ of less than 2 J/g.

Even more in particular a shaped PLA article as described herein preferably shows a melting enthalpy for sc-PLA structures (ΔHsc) of at least 30 J/g with a melting peak above 200° C., and a crystal melting enthalpy for homopolymer polylactide structures (ΔHhc) of less than 5 J/g with a melting peak below 200° C., and no recrystallization as expressed by a negative enthalpy value in the temperature range between 170 and 220° C., as measured by DSC (+10° C./min).

The crystal melting enthalpy provides an indication of the amount of stereocomplex and homopolymer structures present in the shaped article. In articles according to the invention and comprising additives, it is not possible to calculate exact weight fractions of sc-PLA and homo-PLA from their respective heats of fusion, because these crystalline fractions are interrelated. Moreover, additives percentages also must be known exactly, which is not always trivial in case commercial resins or master batches are used, for example.

A shaped article as described herein may generally exhibit good dimensional stability at elevated temperatures, as demonstrated by the Vicat A value of, e.g., at least 200° C. as determined according to ISO 306, in particular of at least 205° C., and more in particular of at least 210° C.

A shaped article as described herein is rigid as PLA typically is. It may generally exhibit high stiffness, supporting good dimensional stability, as shown by the strain at break of, e.g., at least 1% as determined by tensile testing according to ISO 527-1 with a test speed of 10 mm/min, in particular of at least 1.3% more in particular of at least 1.5% and even more in particular of at least 1.7%.

A shaped article as described herein may generally exhibit relatively good impact properties for an scPLA material, as shown by an unnotched Charpy impact value of at least 5 kJ/m$^2$ as determined according to ISO 179/1eU, in particular of at least 10 kJ/m$^2$, more in particular of at least 15 kJ/m$^2$, and even more in particular of at least 18 kJ/m$^2$.

Likewise, a shaped article as described herein may generally show a notched Charpy impact value of 1.2 kJ/m$^2$ as determined according to ISO 179/1eA, in particular of at least 1.4 kJ/m$^2$, and more in particular of at least 1.6 kJ/m$^2$.

A shaped article as described herein may be particularly useful in applications wherein the material is required to withstand relatively high temperatures, such as temperatures at which other bioplastics (e.g. plastics and mouldings based on traditional PLA resins) may suffer from softening or melting (e.g. from 60 to 200° C.). Generally, useful shaped articles include, for example extruded profiles and pipes, sheets, packaging (e.g. containers for foods and beverages such as bottles), catering items (like cutlery, cups, plates and bowls), agricultural materials, gardening materials, fishery materials, civil engineering-construction materials, stationeries, electric and electronic parts (e.g. casings), automotive parts, or the like.

The present invention is further illustrated by the following Examples, without being limited thereto or thereby.

EXAMPLES

Materials

Poly-L-lactide (Revode 190 PLLA and L130 PLLA) was supplied in pellet form by Zhejiang Hisun Biomaterials Co. Ltd., Taizhou City, Zhejiang Province, China, having a Mn of 59 kg/mol, a Mw of 104 kg/mol, and a L/D ratio of 99.7/0.3.

Poly-D-lactide (Synterra® PDLA 1010) was supplied in pellet form by Synbra Technology B.V, The Netherlands, having a Mn of 44 kg/mol, a Mw of 69 kg/mol, and a D/L ratio of 99.8/0.2. Alternatively PDLA (PuraPol D070 resin) branded by Corbion was supplied in pellet form having a Mn of 41 kg/mol, a Mw of 65 kg/mol, and a D/L ratio of 99.8/0.2. All molecular weight properties reported here are absolute values measured with triple-SEC, using the LS detector and with HFiP as the eluent.

The primary anti-oxidant Evernox® 10 (Tetrakis[methylene(3,5-di-tert-butylhydroxy hydrocinnamate)]methane, CAS Number 6683-19-8) was supplied in powder form by Will & Co, The Netherlands.

Irgafos® 168 (Tris(2,4-di-tert-butyl-phenyl)-phosphite, CAS Number 31570-04-4) was supplied in powder form by BTC Benelux, Belgium.

Kaolin (Burgess Iceberg) was supplied in powder form by Omya Benelux, Belgium.

The commercial nucleating agent for PLA, LAK 301 (a salt of dimethyl 5-sulfoisophthalate) was supplied in powder form by Takemoto Oil & Fat, Japan.

Bis-2-ethylhexyl adipate (DOA) plasticizer was supplied in liquid form by Will & Co, The Netherlands.

General Methods

The number average molecular weight (Mn) and the weight average molecular weight (Mw) and the polydispersity index (PDI) were determined using gel permeation chromatography (GPC or SEC) with triple detection (refractive index, light scattering and viscosity detection) using HFiP as the eluent. For calibration of the equipment, polymethyl methacrylate (PMMA) standards were used.

Injection moulding was performed according to ISO 294, under nitrogen atmosphere and using a Demag Ergotech NC IV 25-80 injection moulding machine equipped with a standard PE-screw (diameter 18 mm) and mould for test samples according to ISO 527-2 (dumbbell specimen type 1BA) and ISO 179 (impact specimen type 1). The mould was equipped with a semi-hot runner with an injection hole of 0.8 mm. Barrel temperatures were varied between the feeding zone and the die as indicated in Table I, while the mould temperature was kept at a constant temperature of 140° C.

Tensile tests of moulded samples were performed according to ISO 527-1 using a Zwick tensile tester. The E-modulus (in MPa) was determined with a test speed of 1 mm/min. Thereafter, the test speed was increased to 10 mm/min to determine the other mechanical properties including the maximum stress (in MPa) and the strain at break (in %).

Unnotched Charpy impact tests were performed according to ISO 179/1eU and notched Charpy impact tests were performed according to ISO 179/1eA. Both methods are indicative for ductility and brittleness of materials.

Vicat A values were determined according to ISO 306 using a Ray-Ran HDT-Vicat softening point apparatus.

Thermal properties of moulded specimens were determined by differential scanning calorimetry (DSC) according to the method described ASTM D3418. In particular, a sample was taken from the core of the middle of the tensile bar-shaped PLA article and a first heating scan was performed thereon using a Perkin Elmer Diamond DSC apparatus and stainless steel crucibles using a DSC program with a heating run from 0° C. to 260° C. with a rate of 10° C./min.

The enthalpies of crystal melting (melting enthalpy), the corresponding melting peak temperatures for the homopolymer PDLA or PLLA crystals and for the stereocomplex PLA crystals, and the heat of recrystallizations (negative enthalpy values) were determined from the DSC thermograms (1$^{st}$ heat scan). The content of PLA with homopolymer structures and of PLA with stereocomplex structures is expressed only in Joules per gram of material as derived by peak integration using the DSC software.

Example 1—Preparation of a PLA Shaped Article from a Solids Mixture

A mixture of 94.6 parts by weight of Revode 190 PLLA, 5 parts by weight of Synterra® PDLA 1010, 0.3 parts by weight of Evernox® 10 and 0.1 parts by weight of Irgafos® 168 was compounded on a co-rotating twin-screw extruder (Berstorff ZE 25, D=25 mm and L=40D) using a screw speed of 300 rpm and a temperature profile from the feeding zone to the die of: (feeding zone) 20/80/195/195/195/195/195/188/185/180/160° C. (die).

Before mixing, the commercial PLLA and PDLA pellets were dried in a desiccant air dryer for a minimum of 4 hours at 80-85° C. Similarly, the commercial Evernox® 10 and Irgafos® 168 powders were dried at 40° C. under vacuum for a minimum of 12 hours.

For mixing the PLLA and PDLA pellets were fed (zone 1) by using a gravimetric feeder (Brabender flexwall feeder—spiral screw) under a nitrogen atmosphere. The Evernox® 10 and Irgafos® 168 powders were fed (zone 1) from a volumetric feeder (K-Tron Soder small—twin screw) under nitrogen atmosphere.

The components were mixed by extrusion under the conditions described above, to provide a blend in molten form. Extruded strands of molten blend were cooled by passing them through a cold water bath and were subsequently pelletized using a strand pelletizer, to provide a solidified blend in pelletized form. The resulting pellets had dimensions of approximately 4 by 4 mm.

Subsequently, the solidified blend and an additional amount of PDLA Corbion PuraPol D070 resin were separately dried in a desiccant air dryer at 80-85° C. for a minimum of 4 hours.

After drying, 100 parts of solidified blend and 89.6 parts of PDLA were mixed in the solid state, to provide a solids mixture. This was simply done by putting the solids in a plastic bag, which was closed firmly with a knot, and manual, random movement of the bag in order to arrive at a homogeneous solids mix, i.e., at least to the naked eye.

Hereafter, the solids mixture as such (no further additives were used) was shaped by injection moulding. Moulding was performed as described in the general methods. Three different specimens (A, B and C) were obtained under the conditions of Table I.

The injection moulded specimens were conditioned for 7 days at 20° C. and 50% relative humidity, before further analysis.

The E-modulus, unnotched impact, notched impact, and Vicat A of the moulded articles were determined as described in the general methods above. The results for sample (B) are presented on Table II.

The heat of fusion (melt enthalpy) and the melting peak temperatures of homopolymer PDLA or PLLA crystals and stereocomplex PLA crystals were determined by DSC as described in the general methods above. The results for samples (A), (B), and (C) are presented in Table III. The DSC thermograms for samples (A), (B) and (C) are shown in FIGS. 1, 2, and 3 respectively.

Injection moulding proceeded easily for all samples (A, B, and C). Production of moulded specimens was possible in automatic mode with relatively low pressures, as can be seen from Table I. The sample produced with a maximum temperature of 230° C. (sample C) could be processed with the lowest injection moulding pressures (Table I), but had the lowest Vicat A value and the highest low-melting PLA homopolymer content, (Tables II and III). Moreover, FIG. 3 clearly reveals the presence of recrystallization in the sample from Ex. 1C (230° C.) between both melting peaks, signalling insufficient heat resistance above 180° C.

Samples produced at a die temperature of 210° C. (sample A) and 220° C. (sample B) and the hot runner at 220° C., exhibited Vicat A values above 210° C. and mechanical properties otherwise comparable to typical, injection moulded PLA (Table II).

Figure 2:
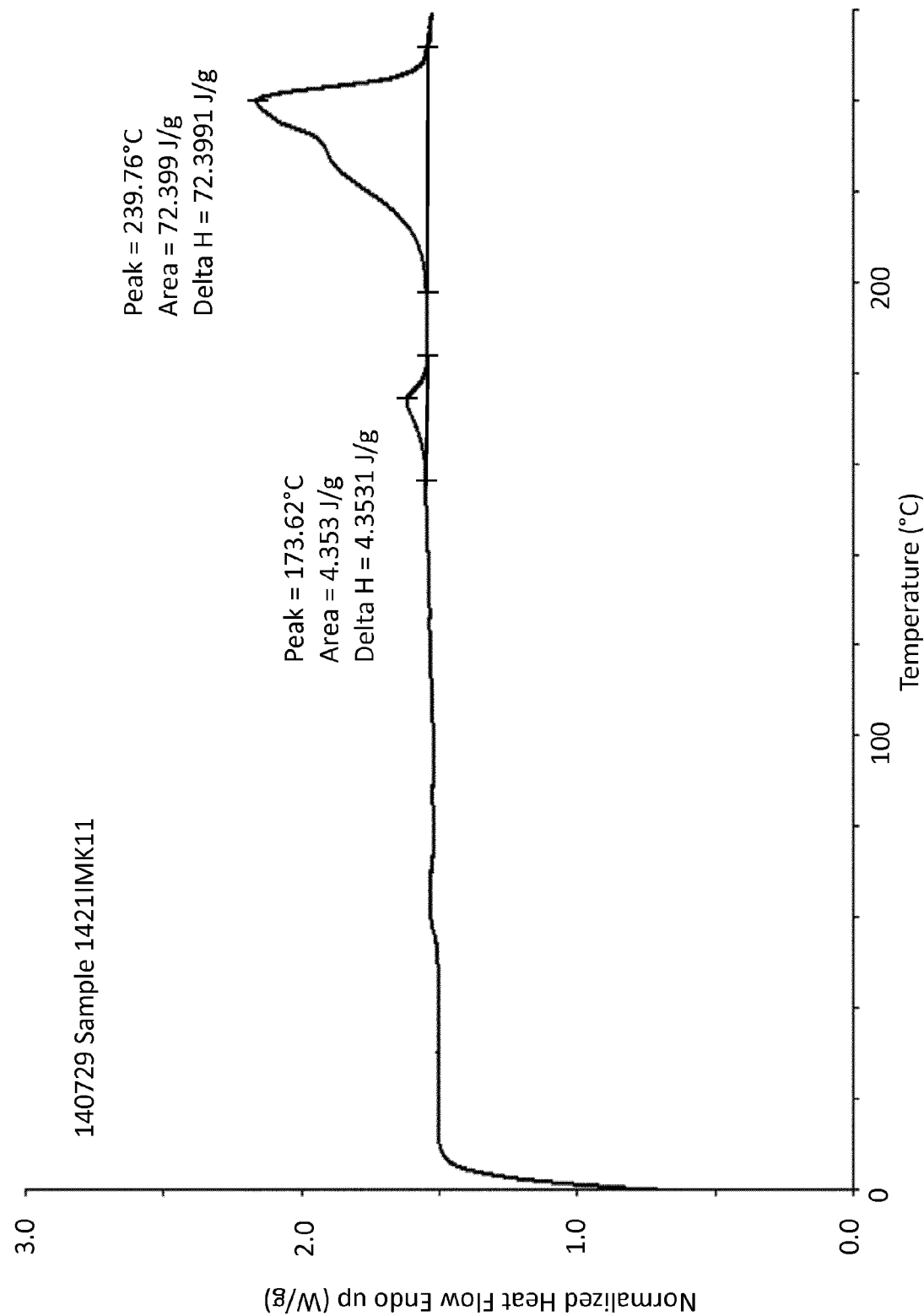
FIG. 2 shows the DSC thermogram for the PLA shaped article of Example 1 obtained from a solids mixture under injection molding conditions (B) as detailed in Table 1.
Figure 3:
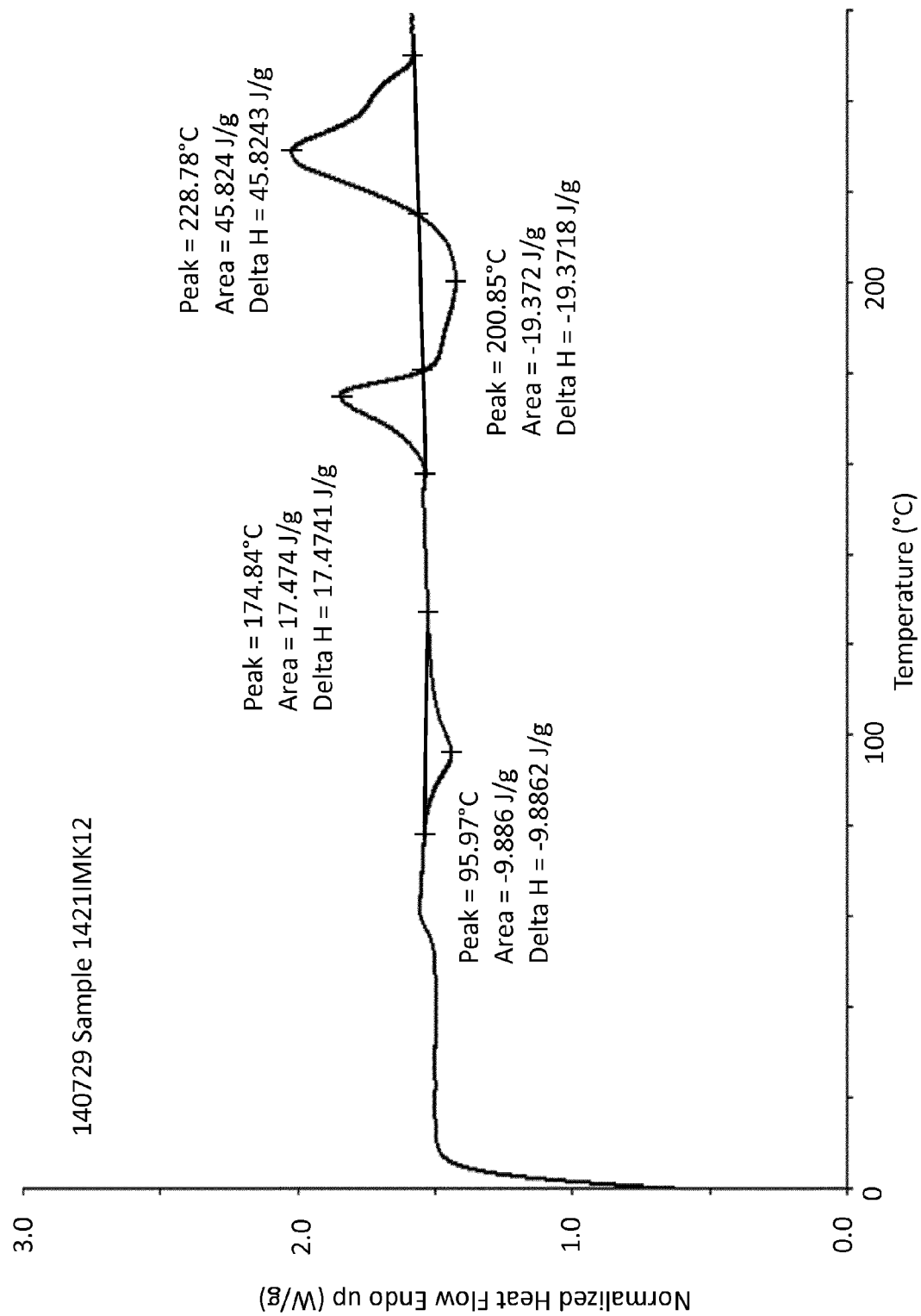
FIG. 3 shows the DSC thermogram for the PLA shaped article of Example 1 obtained from a solids mixture under injection molding conditions (C) as detailed in Table 1.

DSC analysis of the shaped articles obtained confirmed the presence of both high-melting stereocomplex PLA (>70 J/g) and of the undesired low melting PLA homopolymer crystals (<6 J/g) (Table III, FIGS. 1, 2, and 3). As indicated above, processing temperatures between 210 and 230° C. are preferred.

Comparative Example 1—Preparation of a PLA Shaped Article from a Fully Melt Blended Mixture A mixture of 49.9 parts by weight of Revode 190 PLLA, 2.6 parts by weight of Synterra® PDLA 1010, 47.3 parts by weight of Corbion Purapol PDLA D070, 0.15 parts by weight of Evernox® 10 and 0.05 parts by weight of Irgafos® 168 was compounded in molten form by extrusion according the procedure of Example 1 (including the drying of starting materials) using a temperature profile from the feeding zone to the die of: (feeding zone) 20/80/195/215/215/215/210/205/205/200/205° C. (die).

The extruded molten blend was cooled and pelletized as also described above for Example 1.

The solidified blend in pellet form was dried in a desiccant air dryer at 80-85° C. for a minimum of 4 hours. After drying, the pellets were injection moulded under nitrogen atmosphere as such (no further additives used) using an injection moulding procedure as described in the general methods above. Three attempts were performed (A, B, and C) under the conditions listed in Table I. As opposed to the samples of Example 1, prepared by a method according to the invention, no moulded specimens could be obtained, because the fully melt blended mixture could not be processed by injection moulding, not even at the highest barrel and hot runner temperatures of 230° C. Hence, as indicated on Tables II and III, no mechanical or thermal properties could be determined for the material of comparative Example 1.

Example 2—Preparation of a PLA Shaped Article from a Solids Mixture in the Presence of Processing Aids A mixture of 65.2 parts by weight of Revode 190 PLLA, 3.4 parts by weight of Synterra® PDLA 1010, 25 parts by weight of kaolin, 1.0 part by weight of LAK301, 5 parts by weight of DOA, 0.3 parts by weight of Evernox® 10 and 0.1 parts by weight of Irgafos® 168 was mixed in molten form by extrusion according to the procedure described in Example 1. The PDLA and PLLA pellets were fed (zone 1) with the use of a gravimetric feeder (Brabender flexwall feeder—spiral screw) under nitrogen atmosphere, the powders (kaolin, Evernox® 10 and Irgafos® 168) were fed into zone 1 with a volumetric feeder (K-Tron Soder small—twin screw) under nitrogen atmosphere and DOA was injected (zone 2) with the use of a pump (Prominent type HK 20-12.5).

Before extrusion the PLA pellets were dried thoroughly for a minimum of 4 hours at 80-85° C. in a desiccant air dryer. The Kaolin was dried at 80° C. under vacuum for 16 hours and the LAK301, Evernox® 10 and Irgafos® 168 were dried at 40° C. under vacuum for 16 hours.

The extruded molten blend material was cooled and pelletized as also described above for Example 1.

Subsequently the solidified blend in pellet form and PDLA Corbion Purapol D070 were dried separately in a desiccant air dryer at 80-85° C. for a minimum of 4 hours.

After drying, the pellets were mixed in solid form in a ratio of 100 parts of solidified blend to 61.8 parts of Corbion PuraPol D070 as described above for Example 1.

The solids mixture was then injection moulded according the procedure of the general methods. Three specimens (A, B, and C) were obtained under the conditions of Table I.

After injection moulding, specimens were conditioned for 7 days at 20° C. and 50% relative humidity.

The E-modulus, unnotched impact, notched impact, Vicat A were determined as described in the general methods above. The results for sample (B) are presented in Table II.

The melting enthalpies and the melting peak temperatures of homopolymer PDLA or PLLA crystals and stereocomplex PLA crystals were determined by DSC as described in the general methods above. The results for samples (A), (B) and (C) are presented in Table III. DSC thermograms for specimens (A), (B) and (C) are shown in FIGS. 4, 5 and 6 respectively.

Injection moulding proceeded again easily and the production of moulded specimens was possible in automatic mode with even lower pressures than the experiments done for Example 1, as can be seen from Table I. The sample produced with a maximum temperature of 230° C. processed with the lowest injection moulding pressures, but also had the lowest Vicat A value and the highest, low-melting PLA homopolymer crystal content (Tables II and III, FIGS. 4-6). Samples produced at 210 and 220° C. die temperature and the hot runner at 220° C., exhibited Vicat A values above 200° C. and mechanical properties otherwise comparable to typical, injection moulded PLA (Table II). Stiffness (E=3 GPa) of these materials was higher due to the presence of the mineral filler, tensile strength was a bit lower, but impact properties were comparable to the shaped articles prepared under Ex. 1.

Figure 4:
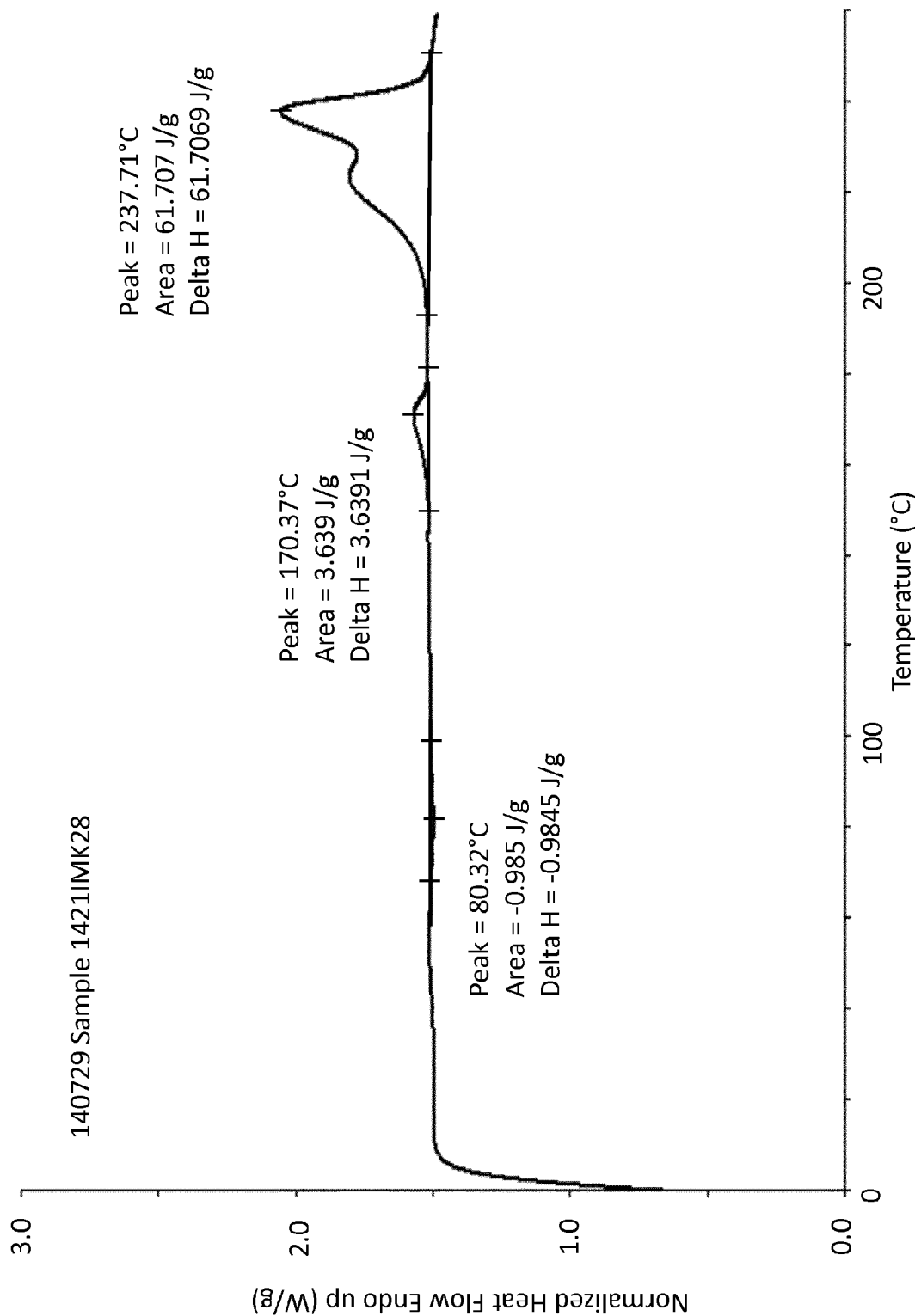
FIG. 4 shows the DSC thermogram for the PLA shaped article of Example 2 obtained from a solids mixture with processing aid under injection molding conditions (A) as detailed in Table 1.
Figure 5:
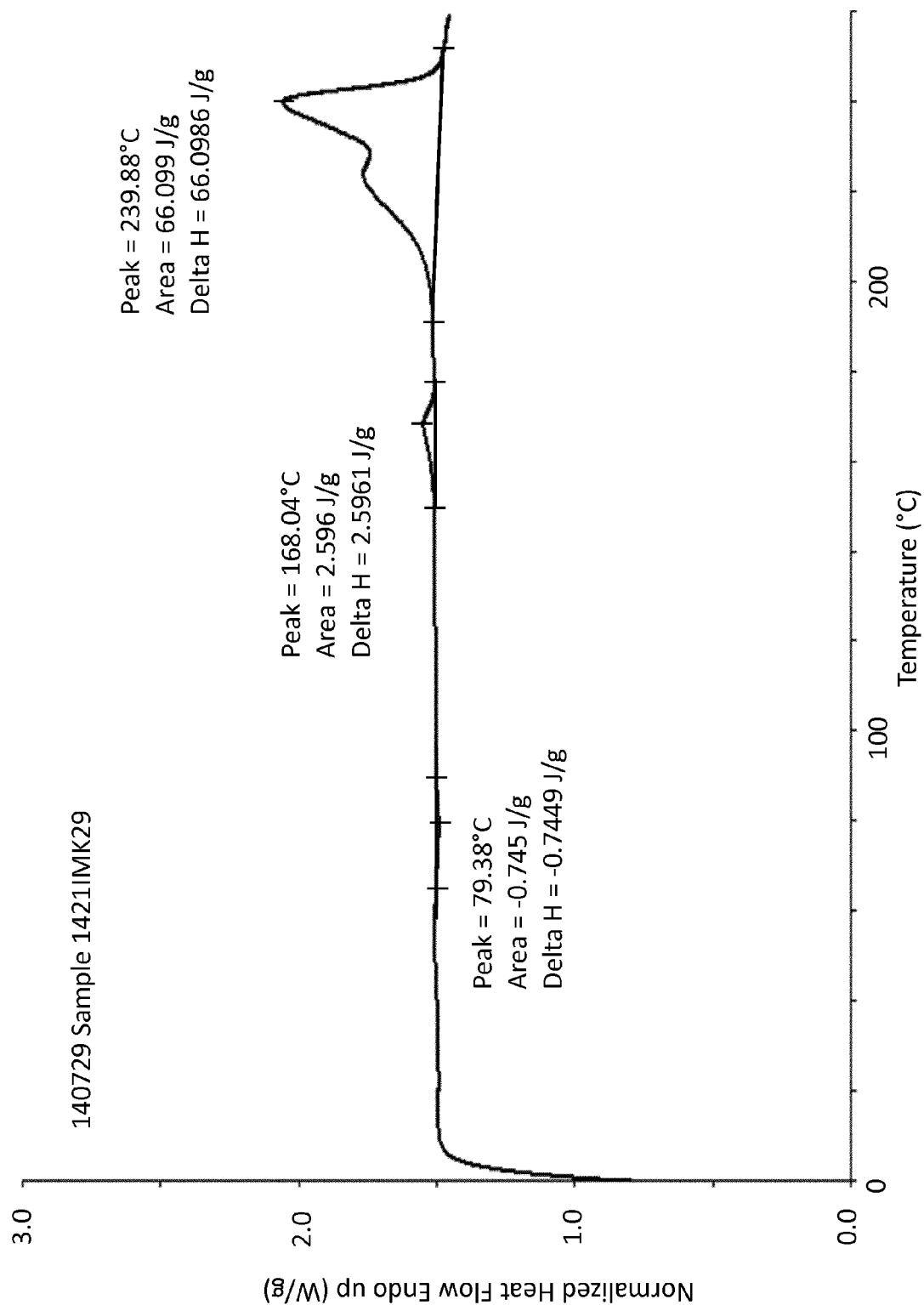
FIG. 5 shows the DSC thermogram for the PLA shaped article of Example 2 obtained from a solids mixture with processing aid under injection molding conditions (B) as detailed in Table 1.
Figure 6:
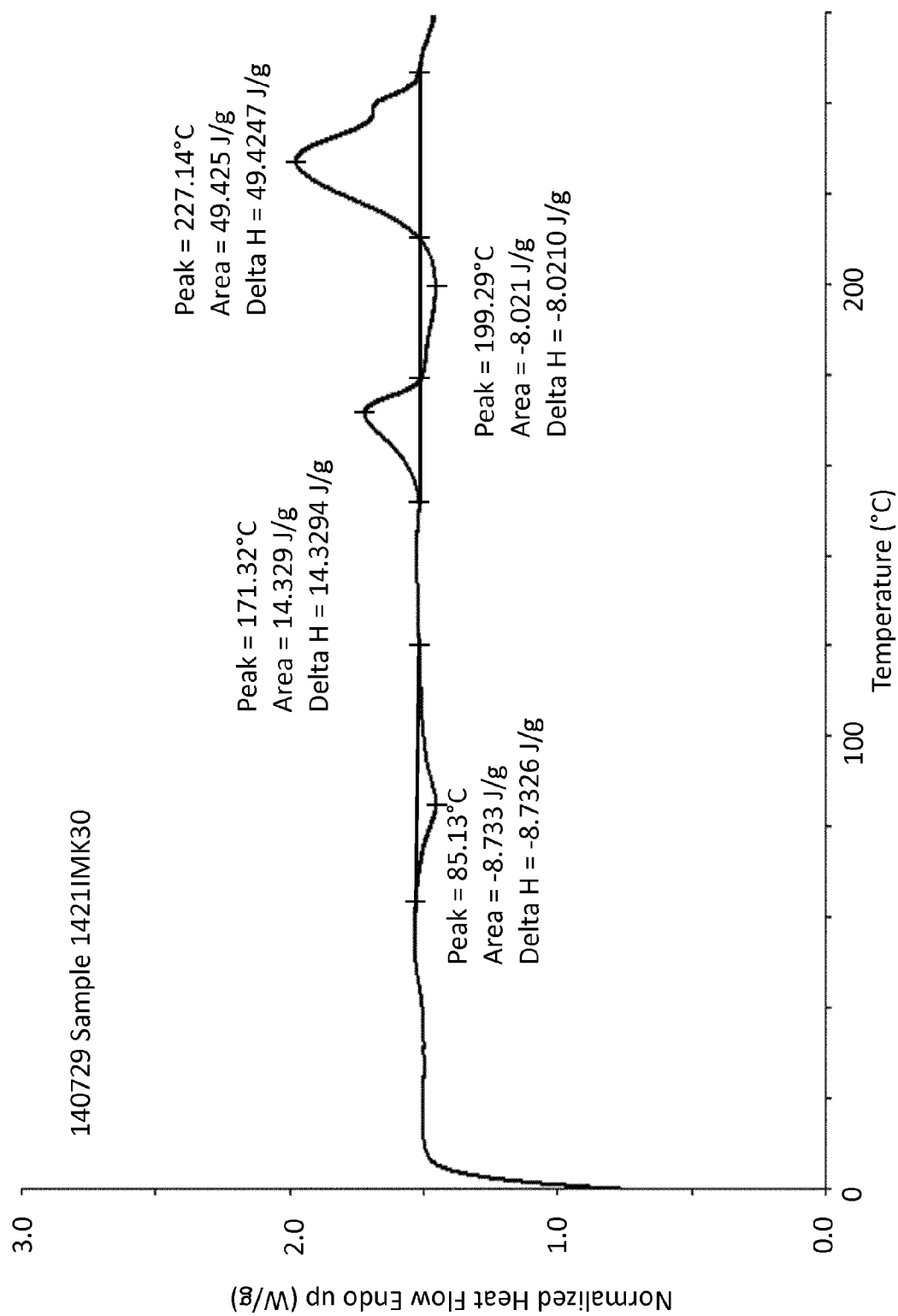
FIG. 6 shows the DSC thermogram for the PLA shaped article of Example 2 obtained from a solids mixture with processing aid under injection molding conditions (C) as detailed in Table 1.

DSC analysis of the obtained mouldings confirmed the high stereocomplex PLA content of >60 J/g, and the low alpha-crystal content (<5 J/g) of PLA homopolymer (Table III, FIGS. 4 and 5).

Comparative Example 2—Preparation of a Polylactide Shaped Article from a Fully Melt Blended Mixture in the Presence of Processing Aids A mixture of 40.3 parts by weight of Revode 190 PLLA, 2.1 parts by weight of Synterra PDLA 1010, 38.2 parts by weight of Corbion Purapol D070, 15.5 parts by weight of kaolin, 0.6 part by weight of LAK 301, 3.1 parts by weight of DOA, 0.15 parts by weight of Evernox® 10 and 0.05 parts by weight of Irgafos® 168 was compounded by extrusion and subsequently cooled and pelletized according to the procedure of Comparative Example 1. Prior to compounding the starting materials were dried as previously described for Example 2.

The resulting mixture was obtained in pellet form and was dried in a desiccant air dryer at 80-85° C. for a minimum of 4 hours. After drying the pellets were injection moulded under nitrogen atmosphere as such (no further additives used) using an injection moulding procedure as described in the general methods. Three specimens (A, B and C) were obtained under the conditions of Table I.

After conditioning under the conditions of Example 2, the E-modulus, unnotched impact, notched impact, and Vicat A values were determined as described in the general methods above. The results for sample (B) are presented on Table II.

Figure 7:
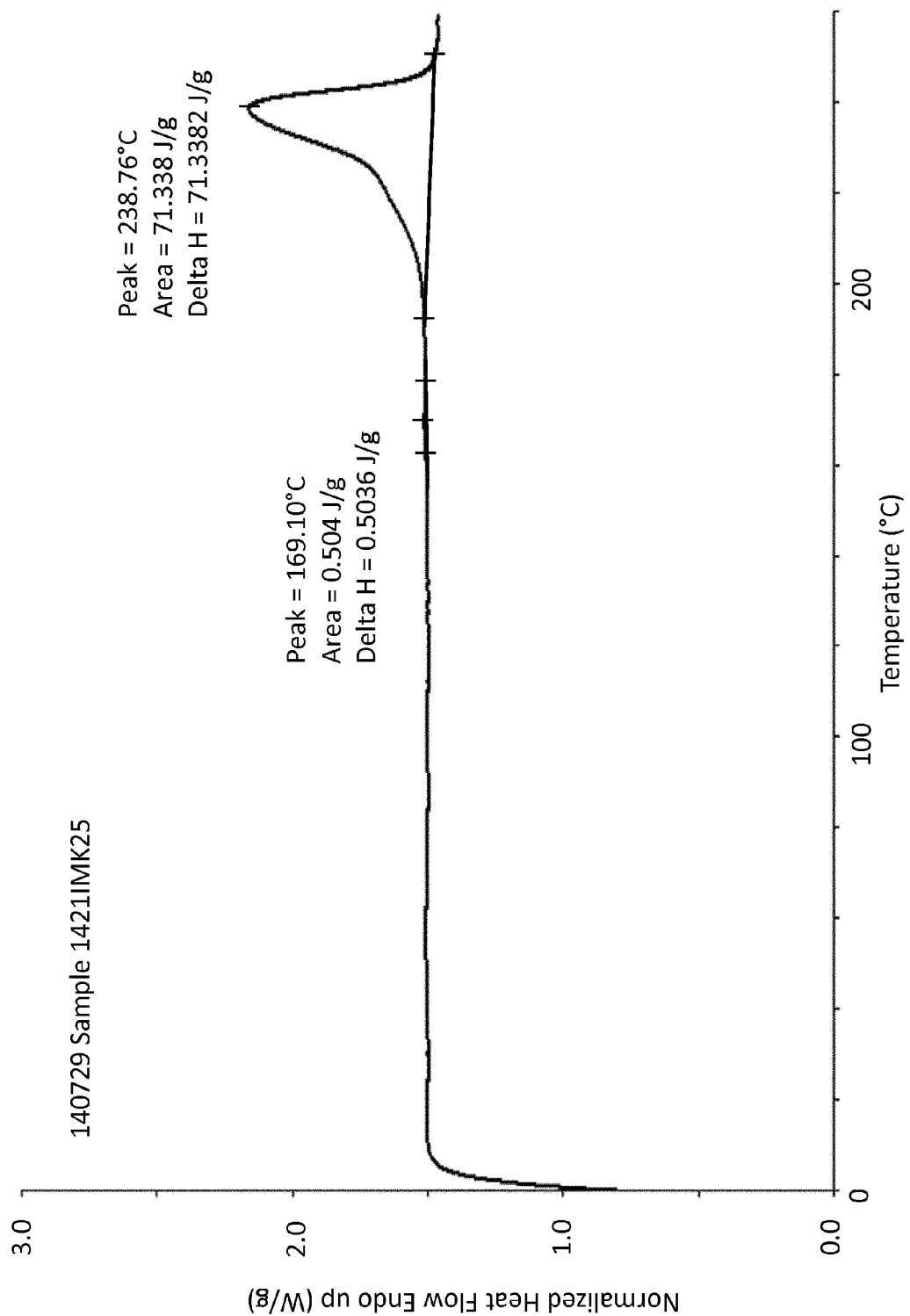
FIG. 7 shows the DSC thermogram for the PLA shaped article of Comparative Example 2 obtained from a melt blended mixture with processing aid under injection molding conditions (A) as detailed in Table 1.
Figure 8:
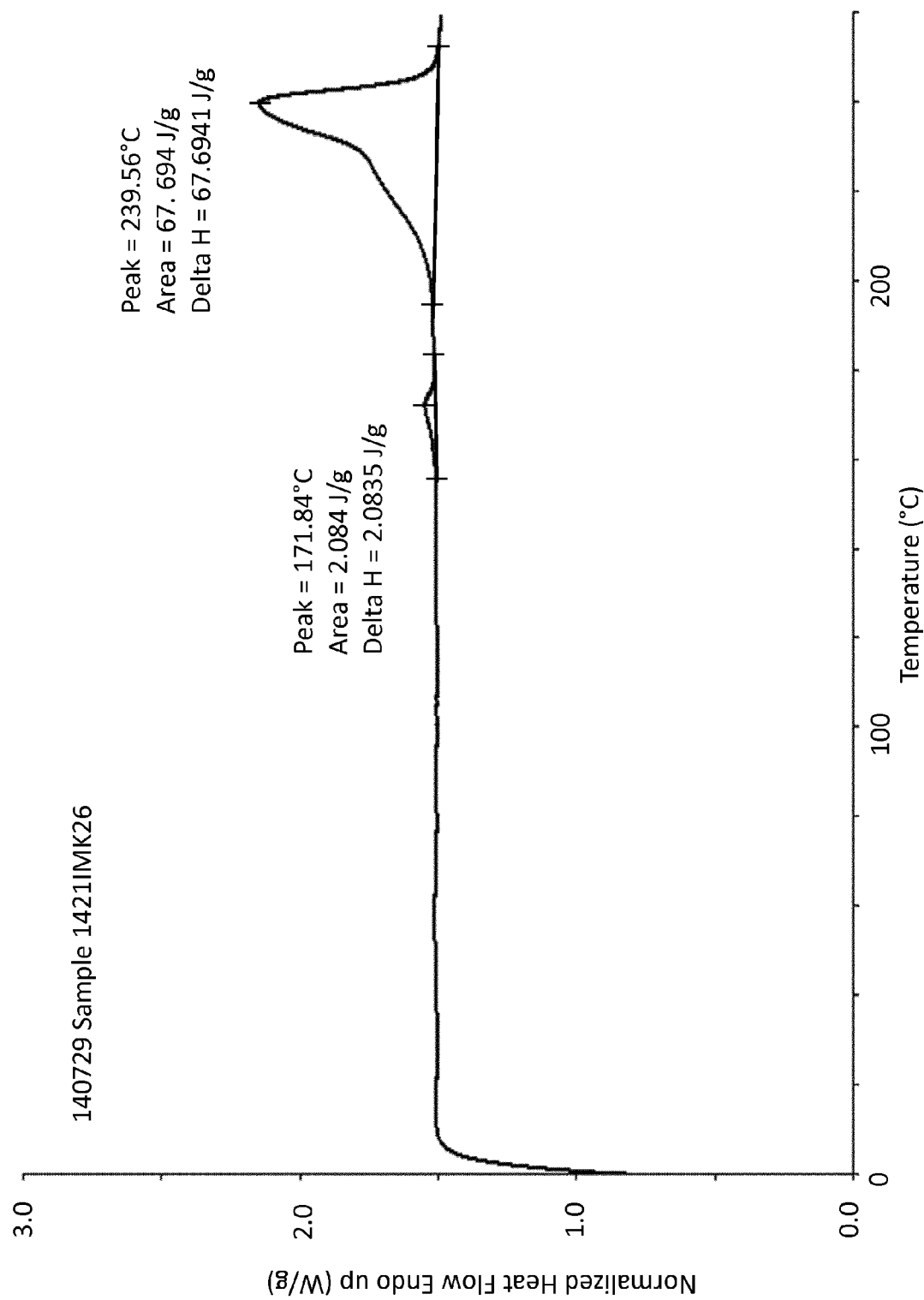
FIG. 8 shows the DSC thermogram for the PLA shaped article of Comparative Example 2 obtained from a melt blended mixture with processing aid under injection molding conditions (B) as detailed in Table 1.
Figure 9:
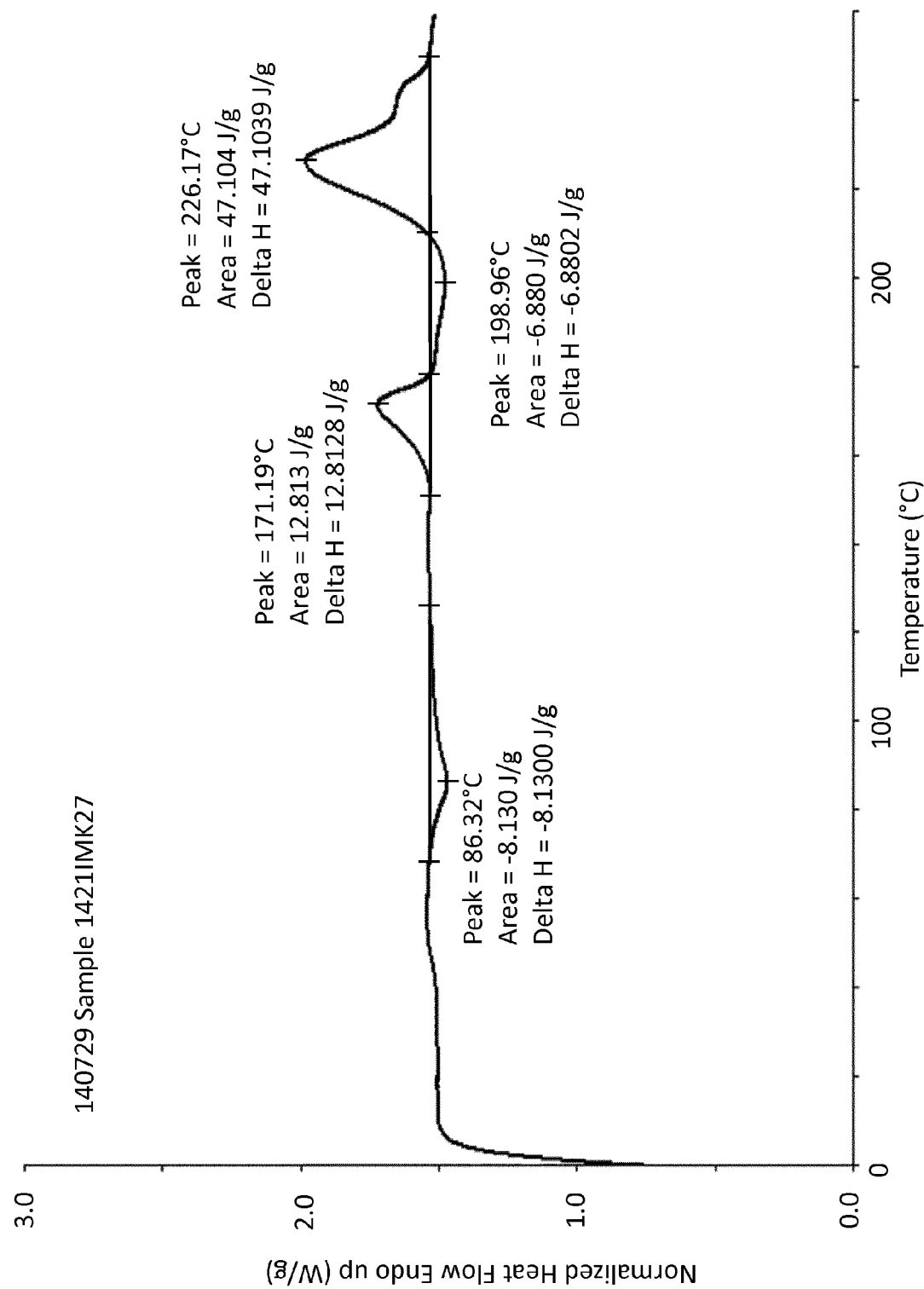
FIG. 9 shows the DSC thermogram for the PLA shaped article of Comparative Example 2 obtained from a melt blended mixture with processing aid under injection molding conditions (C) as detailed in Table 1.

The melting enthalpies and the melting peak temperatures of homopolymer PDLA or PLLA crystals and stereocomplex PLA crystals were determined by DSC as described in the general methods above. The results for samples (A), (B) and (C) are presented in Table III. DSC thermograms for specimens (A), (B) and (C) are shown in FIGS. 7, 8 and 9 respectively.

Although it was found possible to produce moulded samples from the melt blended mixture in the presence of processing aids and fillers, injection moulding pressures were very high and beyond 2000 bars. Also, impact properties of the obtained mouldings were not as good as for compositions processed according to the method of the invention.

Figure 10:
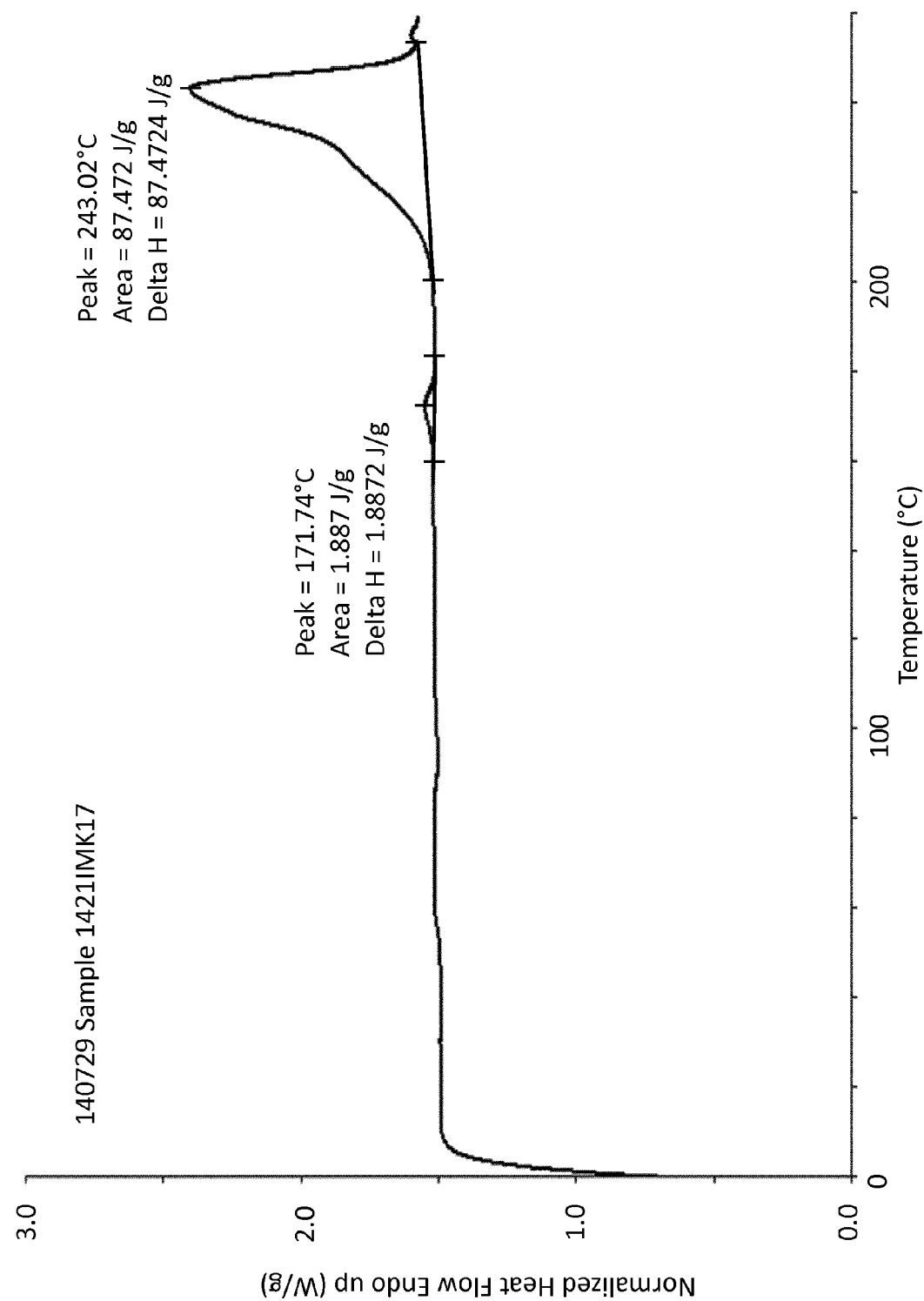
FIG. 10 shows the DSC thermogram for the PLA shaped article of Example 3 obtained from a solids mixture with higher Mw PDLA under injection molding conditions (B) as detailed in Table 1.
Figure 11:
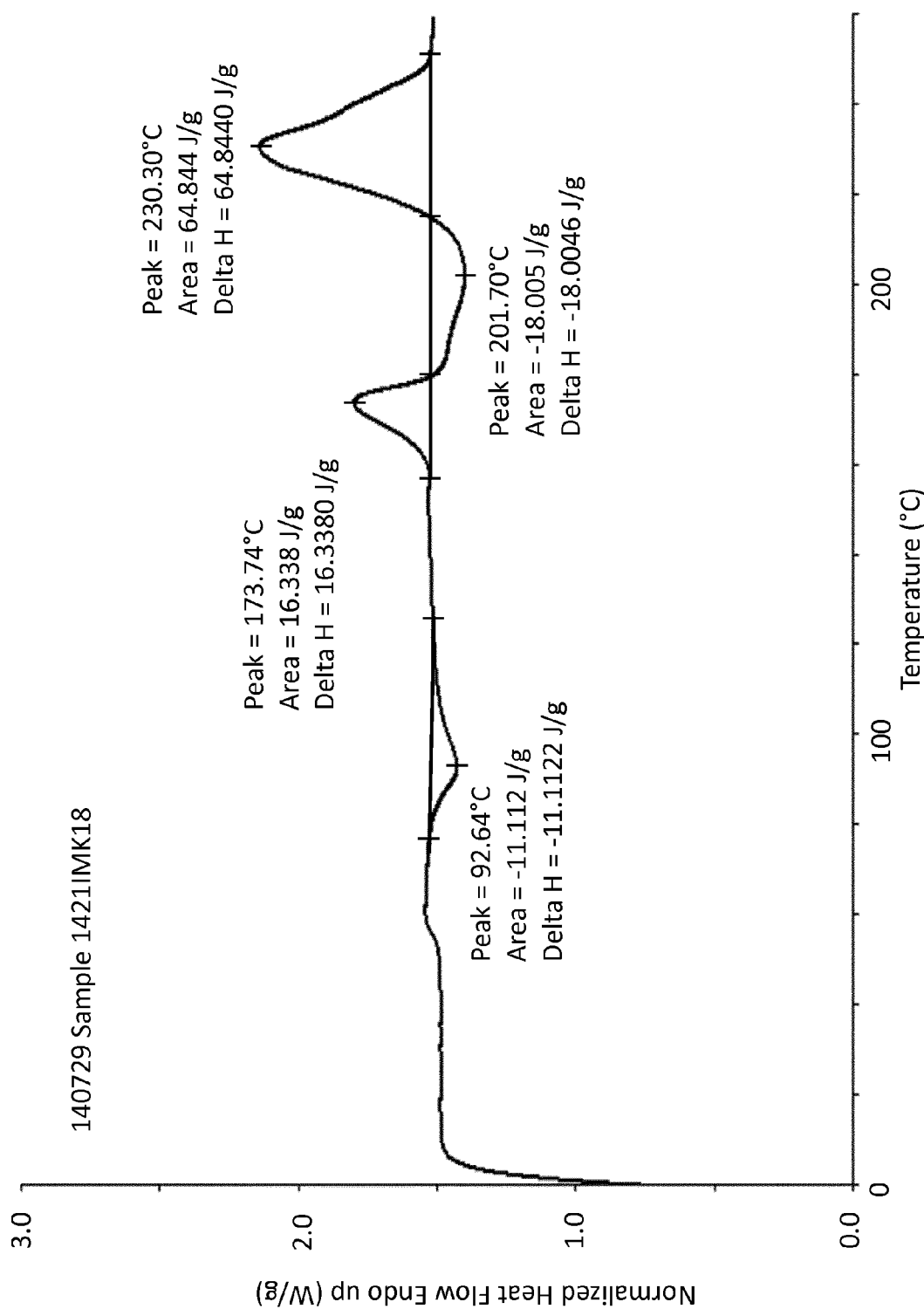
FIG. 11 shows the DSC thermogram for the PLA shaped article of Example 3 obtained from a solids mixture with higher Mw PDLA under injection molding conditions (C) as detailed in Table 1.

Example 3—Preparation of a PLA Shaped Article from a Solids Mixture in the Presence of PDLA of Higher Mw A shaped article was prepared as described before in Example 2, but using Synterra PDLA 1010 of higher Mw than Purapol D070, in the solids mixture. The melting enthalpies and the melting peak temperatures of homopolymer PDLA or PLLA crystals and stereocomplex PLA crystals were determined by DSC as described in the general methods above. The results for samples (A), (B) and (C) are presented in Table III. DSC thermograms for specimens (B) and (C) are shown in FIGS. 10 and 11, respectively.

The results of this example underline that the invented method can also be executed when a PDLA polymer of higher Mw is used in the dry blend. Thermal properties, Vicat values and impact properties are still good and processing can be done in a stable mode.

Figure 12:
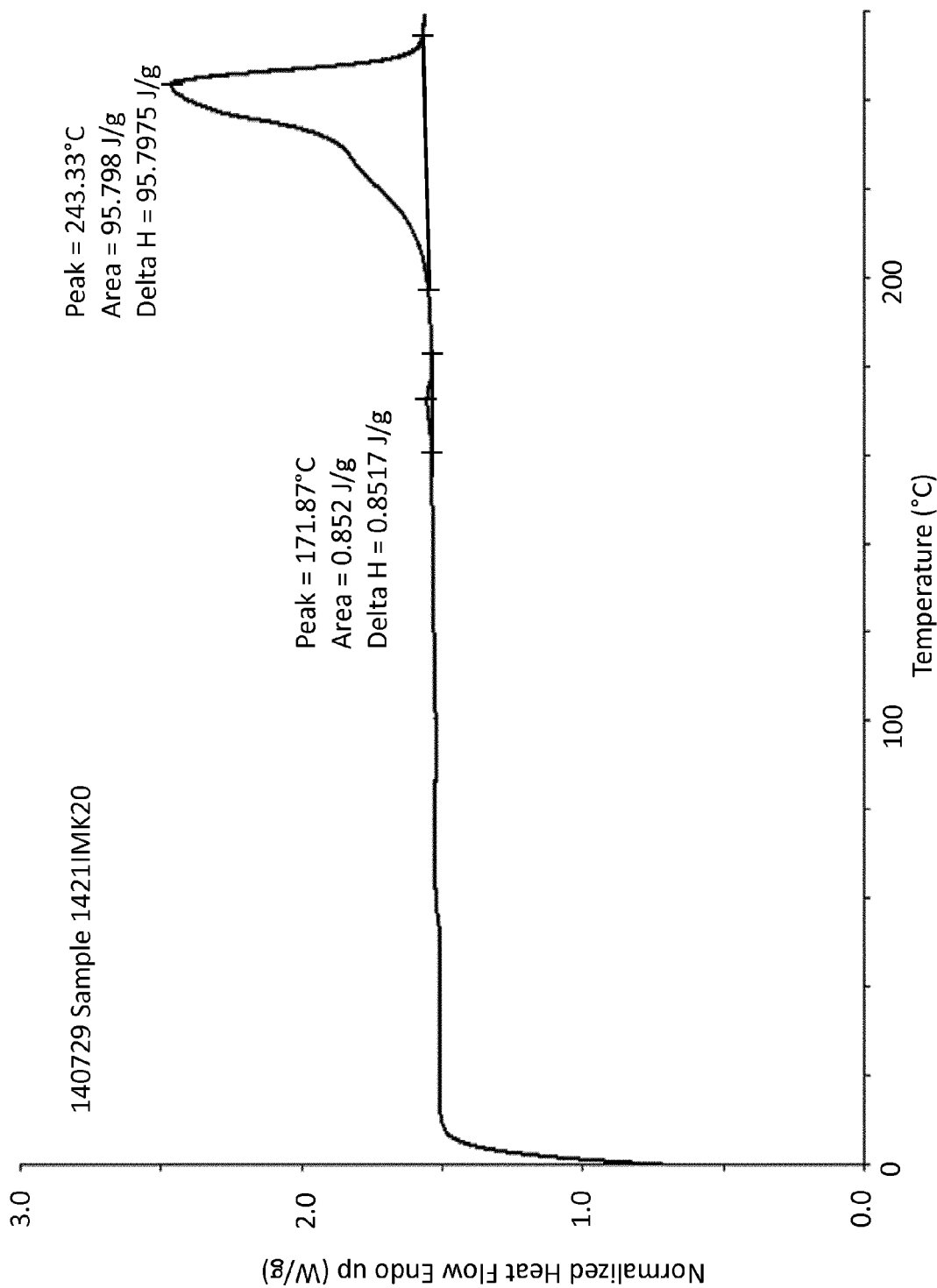
FIG. 12 shows the DSC thermogram for the PLA shaped article of Comparative Example 3 obtained from a melt blended mixture with higher Mw PDLA under injection molding conditions (B) as detailed in Table 1.
Figure 13:
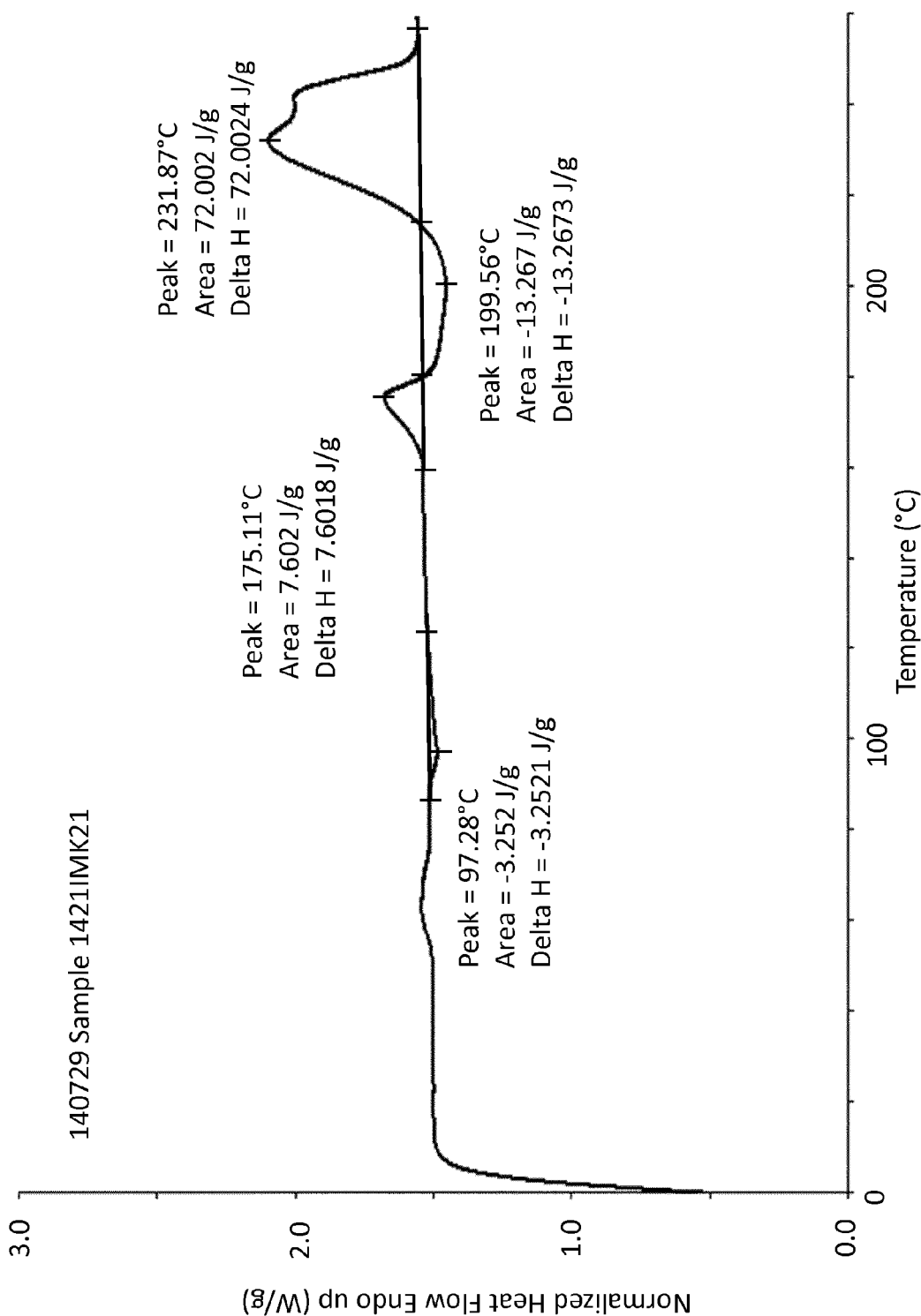
FIG. 13 shows the DSC thermogram for the PLA shaped article of Comparative Example 3 obtained from a melt blended mixture with higher Mw PDLA under injection molding conditions (C) as detailed in Table 1.

Comparative Example 3—Preparation of a PLA Shaped Article from a Fully Melt Blended Mixture in the Presence of PDLA of Higher Mw A shaped article based on Revode 190 PLLA and Synterra PDLA 1010 was prepared as described before in Comparative Example 1, but using Synterra PDLA 1010 of higher Mw than Purapol D070, in the mixture. The melting enthalpies and the melting peak temperatures of homopolymer PDLA or PLLA crystals and stereocomplex PLA crystals were determined by DSC as described in the general methods above. The results for samples (A) and (B) are presented in Table III. DSC thermograms for specimens (B) and (C) are shown in FIGS. 12 and 13, respectively.

Although samples could be produced, injection pressure was very high and the processing window was narrow.

For all examples and comparative examples, the use of a die and hot runner temperature of 230° C. resulted in samples with too much low melting alpha-crystal (i.e. content of homopolymer structures), relative to the desired high melting stereocomplex PLA crystals. In addition, the presence of recrystallization in these sample (230° C.) between both melting peaks, is indicative of the improper heat resistance and relatively poor Vicat A values.

TABLE I

Injection moulding conditions

| Sample | $T_{process}$[1] (° C.) | $T_{hot\ runner}$ (° C.) | $T_{mould}$ (° C.) | Pressure (bar)[2] |
|---|---|---|---|---|
| Example 1 - solids mixture | | | | |
| (A) | 40/170/220/220/210 | 220 | 140 | 1874 |
| (B) | 40/170/220/220/220 | 220 | 140 | 1821 |
| (C) | 40/170/230/230/230 | 230 | 140 | 1308 |
| Comp. Example 1 - melt blended mixture | | | | |
| (A) | 40/170/210/210/220 | 220 | 140 | n.p. |
| (B) | 40/170/220/220/220 | 220 | 140 | n.p. |
| (C) | 40/170/230/230/230 | 230 | 140 | n.p. |
| Example 2 - solids mixture (with processing aids) | | | | |
| (A) | 40/170/210/210/220 | 220 | 140 | 1574 |
| (B) | 40/170/220/220/220 | 220 | 140 | 1416 |
| (C) | 40/170/230/230/230 | 230 | 140 | 1013 |
| Comp. Example 2 - melt blended mixture (with processing aids) | | | | |
| (A) | 40/170/210/210/220 | 220 | 140 | 2446 |
| (B) | 40/170/220/220/220 | 220 | 140 | 2384 |
| (C) | 40/170/230/230/230 | 230 | 140 | 2196 |
| Example 3 - solids mixture (with higher Mw PDLA) | | | | |
| (A) | 40/170/210/210/220 | 220 | 140 | n.p. |
| (B) | 40/170/220/220/220 | 220 | 140 | 2230 |
| (C) | 40/170/230/230/230 | 230 | 140 | 898 |
| Comp. Example 3 - melt blended mixture (with higher Mw PDLA) | | | | |
| (A) | 40/170/210/210/220 | 220 | 140 | n.p. |
| (B) | 40/170/220/220/220 | 220 | 140 | 2432 |
| (C) | 40/170/230/230/230 | 230 | 140 | 1273 |

[1]Barrel temperatures from the feeding zone (left) to the die (right)
[2]Injection moulding pressure: n.p. = not processable by injection moulding

TABLE II

Mechanical and thermal properties of injection moulded specimens**

| Properties | Example 1(B) | Comp.* example 1(B) | Example 2(B) | Comp. Example 2(B) |
|---|---|---|---|---|
| Vicat A (° C.) | 212.6 | n.d. | 209.2 | 212.8 |
| E-modulus (MPa) | 2882 [41]** | n.d. | 3163 [115] | 3259 [102] |
| Stress max (MPa) | 57.1 [3.4] | n.d | 41.6 [5.4] | 47.9 [3.3] |
| Strain at break (%) | 1.7 [0.1] | n.d. | 1.3 [0.2] | 1.5 [0.2] |
| Impact unnotched (kJ/m$^2$) | 19.6 [3.9] | n.d. | 11.9 [3.9] | 5.0 [1.8] |
| Impact notched (kJ/m$^2$) | 1.6 [0.1] | n.d. | 1.6 [0.2] | 1.4 [0.1] |

*n.d. = not determined, the sample could not be moulded
**Values in brackets indicate the scatter in the measured value

TABLE III

Thermal properties from DSC measurements

| | Homopolymer PLLA or PDLA crystals | | | Stereocomplex PLA crystals | | |
|---|---|---|---|---|---|---|
| Sample | ΔH (J/g) | Melting peak (° C.) | Cold crystallization (170-220° C.) (J/g) | ΔH (J/g) | Melting peak (° C.) | FIG. |
| Example 1 - solids mixture | | | | | | |
| (A) | 5.8 | 172.1 | 0 | 73.3 | 238.7 | 1 |
| (B) | 4.4 | 173.6 | 0 | 72.4 | 239.8 | 2 |
| (C) | 17.5 | 174.8 | −19.4 | 45.8 | 228.8 | 3 |
| Comp. Example 1 - melt blended mixture | | | | | | |
| (A)* | n.d. | n.d. | n.d. | n.d. | n.d. | — |
| (B)* | n.d. | n.d. | n.d. | n.d. | n.d. | — |
| (C)* | n.d. | n.d. | n.d. | n.d. | n.d. | — |
| Example 2 - solids mixture (with processing aid) | | | | | | |
| (A) | 3.6 | 170.4 | 0 | 61.7 | 237.7 | 4 |
| (B) | 2.6 | 168.0 | 0 | 66.1 | 239.9 | 5 |
| (C) | 14.3 | 171.3 | −8.0 | 49.4 | 227.1 | 6 |
| Comp. Example 2 - melt blended mixture (with processing aid) | | | | | | |
| (A) | 0.5 | 169.1 | 0 | 71.3 | 238.8 | 7 |
| (B) | 2.1 | 171.8 | 0 | 67.7 | 239.6 | 8 |
| (C) | 12.8 | 171.2 | −6.9 | 47.1 | 226.2 | 9 |
| Example 3 - solids mixture (with higher Mw PDLA) | | | | | | |
| (A)* | n.d. | n.d. | n.d. | n.d. | n.d. | — |
| (B) | 1.9 | 171.7 | 0 | 87.5 | 243.0 | 10 |
| (C) | 16.3 | 173.7 | −18.0 | 64.8 | 230.3 | 11 |
| Comp. Example 3 - melt blended mixture (with higher Mw PDLA) | | | | | | |
| (A) | n.d. | n.d. | n.d. | n.d. | n.d. | — |
| (B) | 0.8 | 171.9 | 0 | 95.8 | 243.3 | 12 |
| (C) | 7.6 | 175.1 | −13.3 | 72.0 | 231.9 | 13 |

*The sample could not be moulded: n.d. = not determined.

Example 4—Preparation of PLA Shaped Articles from Solids Mixtures with a Variation in Mould Cooling Time A mixture of 94.6 parts by weight of Hisun Revode L130 PLLA, 5 parts by weight of Synterra® PDLA 1010, 0.3 parts by weight of Evernox® 10 and 0.1 parts by weight of Irgafos® 168 was compounded by extrusion according to the procedure described in Example 1.

The extruded molten blend material was cooled and pelletized as also described above for Example 1.

Subsequently the solidified blend in pellet form and PDLA (Corbion Purapol D070) were dried separately in a desiccant air dryer at 80-85° C. for a minimum of 4 hours.

After drying, the pellets were mixed in solid form in a ratio of 100 parts of solidified blend to 89.6 parts of Corbion PuraPol D070 as described above for Example 1.

The solids mixture was then injection moulded according the procedure of the general methods. The mould temperature was again kept constant at 140° C., while mould cooling times were varied between 60 and 5 seconds. The hot runner and the final zones of the injection moulding machine were set at a fixed temperature of 220° C. Both tensile and impact test bars were made.

After injection moulding, specimens were conditioned for 7 days at 20° C. and 50% relative humidity.

The E-modulus, unnotched and notched impact, and Vicat A were determined as described in the general methods above. The results for are presented in Table IV.

Injection moulding proceeded again easily and the production of moulded tensile specimens was possible in automatic mode. Tensile specimens produced with a mould cooling time of 5-10 seconds occasionally adhered to the mould, and longer cycle times resulted in higher injection moulding pressures, but operation could be continued automatically always. All samples exhibited Vicat A values above 210° C. Sample 4c produced according to the invention with a mould cooling time of 20 seconds particularly stands out with stable, automatic processing behaviour, a Vicat A value of 215° C. and almost 80 J/g of crystallinity, predominantly stereocomplex PLA with a peak melting point of 241° C.

Results of tensile tests depicted in Table 4 do not show significant differences in mechanical properties as a result of cooling time variation and compare well to the values of the shaped articles prepared under Ex. 1 and 2. The same holds for impact properties, although it was found impossible to mould a sample with the lowest mould cooling time of only 5 seconds. The thicker impact specimens require longer moulding time than the tensile specimens, but with 20-60 seconds automatic operation was possible.

Figure 14:
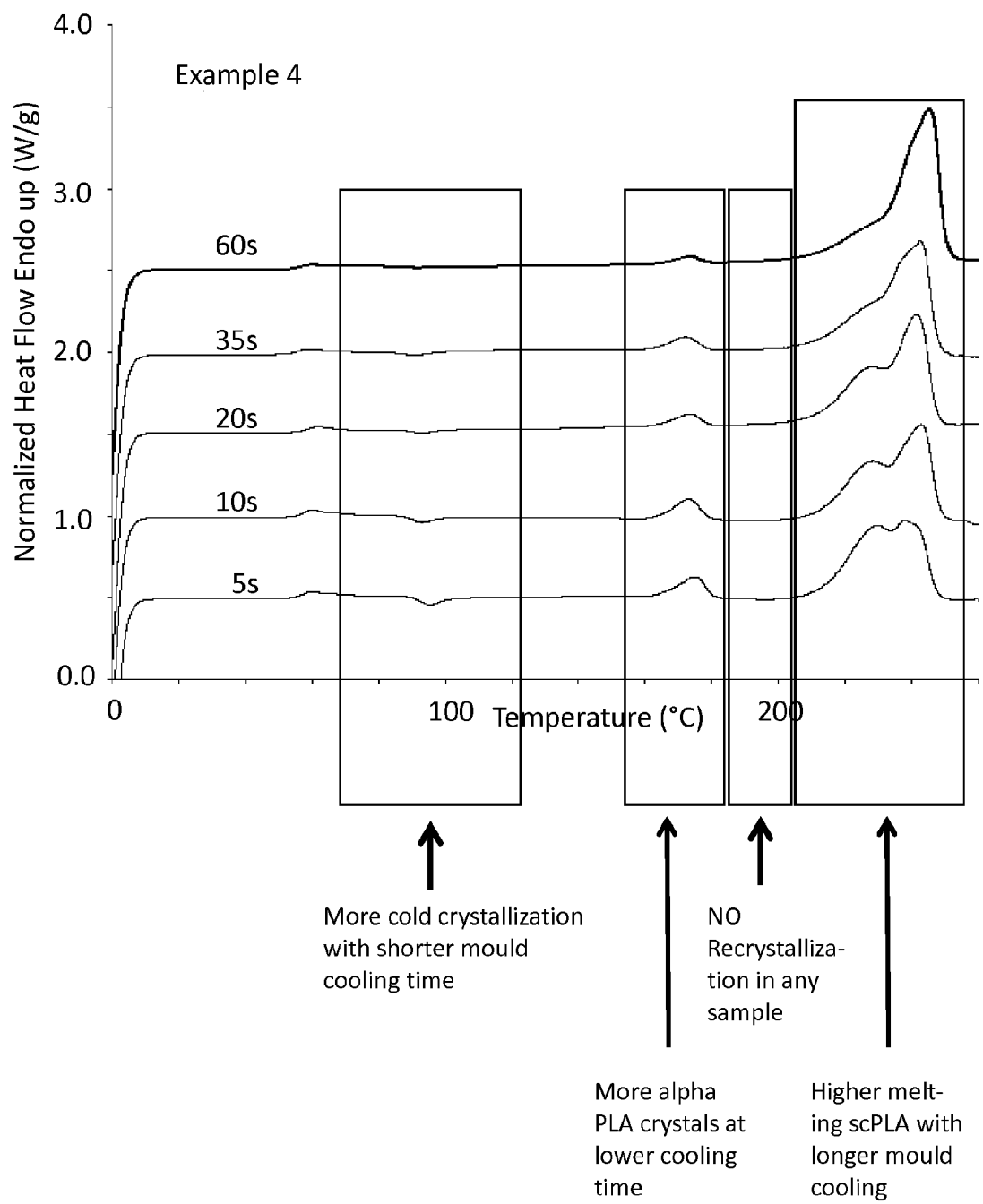
FIG. 14 shows the DSC thermograms for the PLA shaped articles of Example 4 obtained from a solids mixture with varying mold cooling times.

The melting enthalpies and the melting peak temperatures of homopolymer PDLA or PLLA crystals and stereocomplex PLA crystals were determined by DSC as described in the general methods above. The results are presented in Table V. DSC thermograms for tensile specimens produced with a variation in mould cooling time are shown in FIG. 14. As would be expected, level of crystallinity increases with mould cooling time. Also, the second melting peak of scPLA was found to shift to higher temperatures with longer mould cooling time. Recrystallization of alpha-crystal into scPLA crystals after melting the alpha phase (of homopolymer) is absent.

DSC analysis of the obtained mouldings confirmed the high crystal melting enthalpy for stereocomplex polylactide structures ($\Delta H_{sc}$) of >70 J/g, with a melting peak above 230° C., and a crystal melting enthalpy for homopolymer polylactide structures ($\Delta H_{hc}$) of less than 10 J/g with a melting peak below 200° C., and no recrystallization as expressed by a negative enthalpy value in the temperature range between 170 and 220° C., (Table V, FIG. 14).

Comparative Example 4—Preparation of PLA Shaped Articles from a Dry PLLA/PDLA Solids Mixture with a Variation in Mould Cooling Time A mixture of 50 parts by weight of Hisun Revode L130 PLLA and 50 parts by weight of PDLA Corbion Purapol D070 was prepared by pellets mixing in order to obtain a dry blend as described above for Example 4. The difference is that here PLLA pellets were mixed with PDLA pellets, while in Example 4 the latter PDLA was mixed with an extruded, cooled and pelletized blend of PLLA, PDLA and stabilizers. Both resin types had previously been dried separately in a desiccant air dryer at 80-85° C. for a minimum of 4 hours.

This solids mixture was then injection moulded as described above for Example 4. Both tensile and impact test bars were made.

After injection moulding, specimens were conditioned for 7 days at 20° C. and 50% relative humidity.

Tensile properties, unnotched impact, notched impact, and Vicat A were determined as described in the general methods above, and results are depicted in Table IV.

The key difference with Example 4 is that here the solids mixture contains a pure PLLA resin, while the solids mixture from Example 4 contained a PDLA nucleated PLLA, called n-PLLA. So the relevance of this comparative example is to demonstrate the necessity of having PDLA nucleation in the (compounded) PLLA prior to injection moulding of a solids mix with PDLA resin to arrive at formulations capable of developing predominantly stereocomplex crystallinity.

Injection moulding was found to be more difficult than for comparable conditions with the nucleated PLLA formulation of Example 1. The production of moulded tensile specimens in automatic mode was complicated by difficult mould release, weak specimens that deform upon ejection, and sticking to the metal of the mould. All moulded samples exhibited Vicat A values above 200° C. and tensile properties were satisfactory, but DSC analysis revealed that crystallization development is this material was much slower than in that of Example 4. Cold crystallization between 80 and 120° C. explains the difficult moulding behaviour, and the homopolymer crystal content of >10 J/g indicates incomplete development of stereocomplex crystallinity. The latter is confirmed by the wide melting range, which only shows crystal melting enthalpy for stereocomplex polylactide structures ($\Delta H_{sc}$) of 65 J/g at best, and a melting peak of <230° C.

Figure 15:
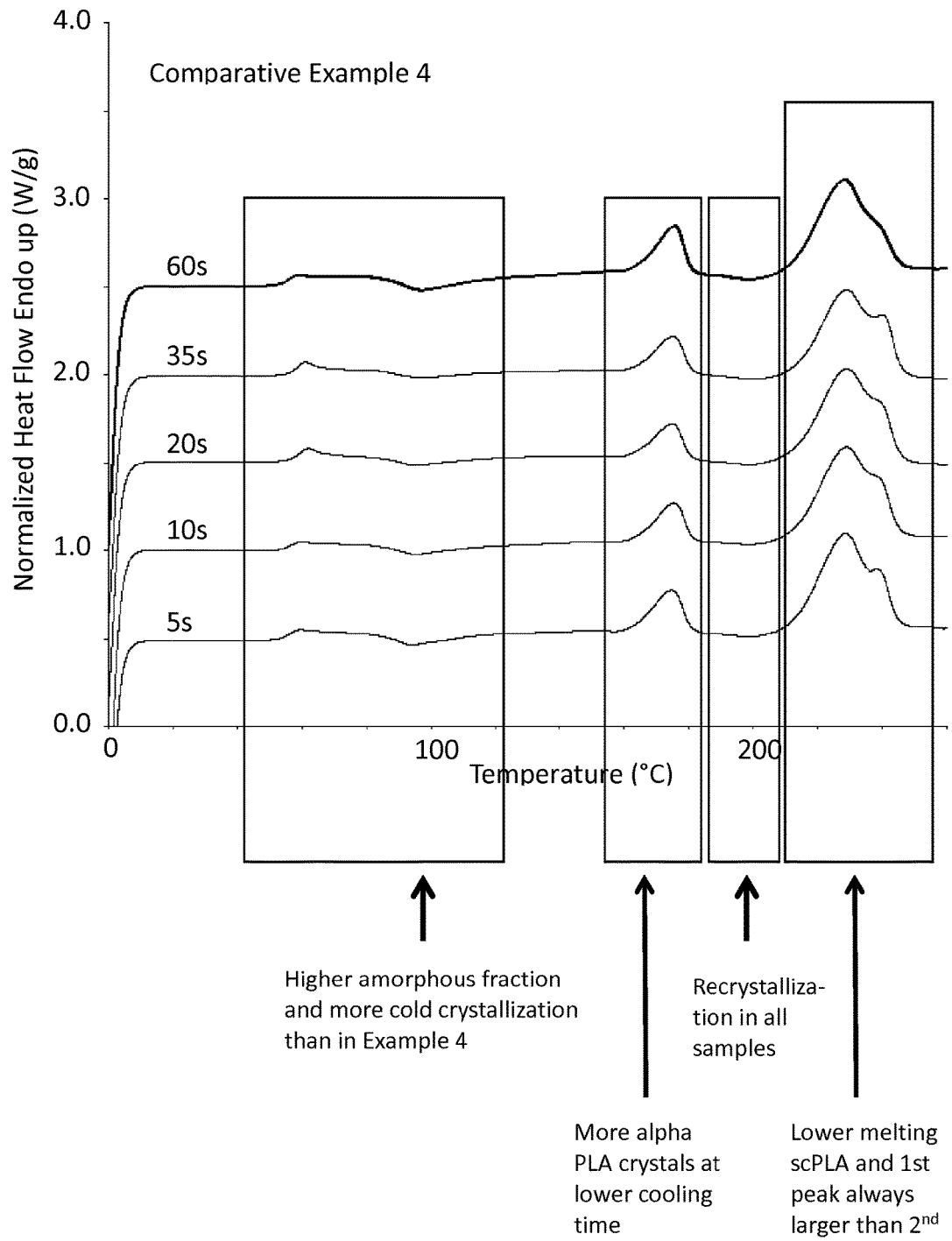
FIG. 15 shows the DSC thermograms for the PLA shaped articles of Comparative Example 4 obtained from a dry PLLA/PDLA solids mixture with varying mold cooling times.

Results of the DSC analysis are further depicted in Table V. Furthermore, FIG. 15 reveals that there is recrystallization between both melting zones and the melting peak of scPLA is lower than that in Example 4, which are all signals of less perfect crystallization into the stereocomplex crystal form.

Both injection moulding behaviour and mechanical and thermal properties of the formulation and method of Example 4 are superior over the process of Comparative Example 4. These and other examples illustrate the invention and in particular underline the essence of having a second homopolylactide (PDLA in this case) blended with the first homopolylactide resin (here PLLA) component of the dry solids mixture with additional second homopolylactide, that is used for injection moulding to obtain shaped polylactide articles comprising stereocomplex polylactide.

TABLE IV

Processing and physical properties of injection moulded specimens[#]

| Sample | Mould cooling time (s) | Injection pressure[¥] (bar) | E-Modulus (MPa) | Stress-max (MPa) | Strain at break (%) | Impact resistance (all in kJ/m$^2$) Unnotched | Impact resistance (all in kJ/m$^2$) Notched | Vicat A (1 kg) (° C.) |
|---|---|---|---|---|---|---|---|---|
| Ex. 4a | 60 | 2124 | 3442 [29] | 35.5 [8.1] | 1.0 [0.3] | 14.1 [3.8] | 1.5 [0.2] | 210.7 |
| Ex. 4b | 35 | 1802 | 3428 [27] | 43.4 [3.9] | 1.3 [0.1] | 12.2 [5.1] | 2.1 [0.6] | 211.2 |
| Ex. 4c | 20 | 1558 | 3436 [80] | 50.3 [7.3] | 1.5 [0.2] | 15.3 [8.1] | 2.3 [0.6] | 215.4 |
| Ex. 4d | 10 | 1264 | 3484 [82] | 53.9 [6.8] | 1.6 [0.2] | 16.9 [4.8] | 1.8 [0.6] | 210.2 |
| Ex. 4e | 5 | 1229 | 3514 [88] | 51.8 [7.2] | 1.5 [0.3] | n.d.* | n.d.* | 210.7 |
| Comp. Ex. 4a | 60 | 1492 | 3574 [38] | 49.7 [6.8] | 1.4 [0.2] | 16.7 [3.8] | 1.6 [0.5] | 211.7 |
| Comp. Ex. 4b | 35 | 1516 | 3506 [69] | 54.6 [6.7] | 1.6 [0.2] | 16.8 [5.1] | 1.5 [0.1] | 209.3 |
| Comp. Ex. 4c | 20 | 1411 | 3555 [62] | 59.0 [3.2] | 1.7 [0.1] | 14.4 [4.3] | 1.8 [0.6] | 207.5 |
| Comp. Ex. 4d | 10 | 1555 | 3533 [64] | 58.9 [2.4] | 1.7 [0.1] | n.d.* | n.d.* | 207.3 |
| Comp. Ex. 4e | 5 | 1569 | 3596 [47] | 50.1 [3.6] | 1.4 [0.1] | n.d.* | n.d.* | 196.3 |

[#]Values in brackets indicate the scatter in the measured value.
[¥]Injection moulding pressures for production of tensile bars are listed. Those for producing impact bars were all much lower (<1000 bar).
*The sample could not be produced by injection moulding; n.d. = not determined

TABLE V

Thermal properties from DSC measurements of injection moulded tensile specimens

| Sample | Homopolymer PLLA or PDLA crystals ΔH (J/g) | Homopolymer PLLA or PDLA crystals Melting peak (° C.) | Homopolymer PLLA or PDLA crystals Cold crystallization (170-220 ° C.) | Stereocomplex PLA crystals ΔH (J/g) | Stereocomplex PLA crystals Melting peaks (° C.) | Figure |
|---|---|---|---|---|---|---|
| Example 4 - Solids mixture n-PLLA and PDLA070 | | | | | | |
| a | 2.2 | 173.1 | no | 88.7 | 245.2 | 14 |
| b | 4.6 | 172.2 | no | 77.5 | 242.6 | 14 |
| c | 4.1 | 173.5 | no | 75.3 | 241.4 | 14 |
| d | 7.3 | 172.9 | no | 72.9 | 242.9 | 14 |
| e | 7.7 | 175.0 | no | 70.8 | 237.8 | 14 |
| Comp. Example 4 - Solids mixture PLLA and PDLA070 | | | | | | |
| a | 15.7 | 175.6 | yes | 58.7 | 228.5 | 15 |
| b | 12.4 | 175.3 | yes | 60.1 | 229.0 | 15 |
| c | 11.5 | 174.7 | yes | 65.2 | 228.9 | 15 |
| d | 14.0 | 175.3 | yes | 62.1 | 228.7 | 15 |
| e | 14.5 | 174.4 | yes | 61.6 | 228.7 | 15 |

The invention claimed is:

1. A method for manufacturing a shaped polylactide article comprising stereocomplex polylactide (sc-PLA), which method includes the following steps:
 a) mixing an amount of a first homopolylactide with an excess amount of a second homopolylactide in the molten state to provide a molten blend, the first and second homopolylactides being different from each other and selected from a poly-D-lactide (PDLA) homopolymer and a poly-L-lactide (PLLA) homopolymer;
 b) solidifying the molten blend and allowing it to crystallize to provide a solidified blend comprising sc-PLA;
 c) mixing the solidified blend with an additional amount of the first homopolylactide in the solid state to provide a solids mixture;
 d) shaping the solids mixture by melt processing the solids mixture at a temperature above the melting temperature of the PDLA and PLLA homopolymers and below the melting temperature of the sc-PLA, and cooling the melt processed mixture to a temperature below the melting temperature of the PDLA and PLLA homopolymers to provide a shaped polylactide article comprising sc-PLA.

2. The method according to claim 1, wherein the weight average molecular weight Mw of at least one of the PLLA and PDLA homopolymers is of at least 10000 g/mol as determined by gel permeation chromatography (GPC) with triple detection and hexafluoroisopropanol as the eluent.

3. The method according to claim 1, wherein in step a) the weight ratio of the second homopolymer with respect to first homopolymer is of at least 75:25 and is of at most 99:1.

4. The method according to claim 1, wherein the melt mixing of step a) is performed at a temperature from 170 to 230° C.

5. The method according to claim 1, wherein step a) is performed by extrusion to provide an extruded molten blend.

6. The method according to claim 1, wherein the molten blend is pelletized to provide a solidified blend in pelletized form.

7. The method according to claim 1, wherein the crystallization of step b) is performed at a temperature from 70 to 130° C.

8. The method according to claim 1, wherein the solid mixing of step c) is performed at a temperature from 0 to 70° C.

9. The method according to claim 1, wherein the shaping of step d) is performed by extrusion or by molding.

10. The method according to claim 1, wherein the melt processing of the solids mixture of step d) is performed at a temperature of above 180 and below 240° C.

11. The method according to claim 1, wherein the shaping of step d) is done by injection molding with an injection pressure from 50 to 5000 bar.

12. The method according to claim 1, wherein the melt mixing of step a) and/or the solid mixing of step c) is performed in the presence of a nucleating agent.

13. A shaped polylactide article comprising stereocomplex-polylactide obtained by a method according to claim 1, whereby the article shows a melting peak of at least 235° C. as determined by DSC.

14. The shaped polylactide article of claim 13 showing a Vicat A value of at least 200° C. as determined according to ISO 306.

15. The shaped polylactide article of claim 13 showing a crystal melting enthalpy for stereocomplex polylactide structures ($\Delta Hsc$) of at least 10 J/g with a melting peak above 200° C., and a crystal melting enthalpy for homopolymer polylactide structures ($\Delta Hhc$) of less than 10 J/g with a melting peak below 200° C., and no recrystallization as expressed by a negative enthalpy value in the temperature range between 170 and 220° C., as measured by DSC (+10° C./min).

* * * * *